US008979347B2

(12) United States Patent
Holman

(10) Patent No.: US 8,979,347 B2
(45) Date of Patent: Mar. 17, 2015

(54) ILLUMINATION SYSTEMS AND METHODS

(75) Inventor: Robert L. Holman, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 18 days.

(21) Appl. No.: 13/454,845

(22) Filed: Apr. 24, 2012

(65) Prior Publication Data
US 2013/0279197 A1 Oct. 24, 2013

(51) Int. Cl.
F21V 21/00 (2006.01)
F21V 7/06 (2006.01)
F21V 29/00 (2006.01)

(52) U.S. Cl.
USPC ............... 362/613; 362/249.02; 362/249.06; 362/230; 362/296.01; 362/285; 362/294

(58) Field of Classification Search
USPC ............................. 362/613, 241, 247, 227, 362/249.01–249.03, 249.07, 285, 287, 362/296.01, 311.01, 311.02, 311.12, 373, 362/555, 615, 628, 297, 347, 609, 608, 362/623–625
See application file for complete search history.

(56) References Cited

U.S. PATENT DOCUMENTS

| | | | |
|---|---|---|---|
| 3,923,381 A | 12/1975 | Winston | |
| 4,460,939 A | 7/1984 | Murakami et al. | |
| 4,861,124 A * | 8/1989 | Labaugh et al. | ............ 359/212.1 |
| 5,255,171 A | 10/1993 | Clark | |
| 6,183,100 B1 | 2/2001 | Suckow et al. | |
| 6,283,602 B1 | 9/2001 | Kawaguchi et al. | |
| 6,536,921 B1 | 3/2003 | Simon | |
| 6,667,582 B1 | 12/2003 | Procter | |
| 6,848,822 B2 | 2/2005 | Ballen et al. | |
| 6,895,163 B2 | 5/2005 | Kawashima | |
| 6,948,830 B1 | 9/2005 | Petrick | |
| 7,025,482 B2 * | 4/2006 | Yamashita et al. | ............ 362/511 |
| 7,072,096 B2 | 7/2006 | Holman et al. | |
| 7,213,958 B2 | 5/2007 | Ouderkirk et al. | |

(Continued)

FOREIGN PATENT DOCUMENTS

| | | |
|---|---|---|
| GB | 2478986 A | 9/2011 |
| GB | 2478987 A | 9/2011 |

(Continued)

OTHER PUBLICATIONS

"How is white light made with LEDs", May 2013, Lighting Research Center.*

(Continued)

*Primary Examiner* — Diane Lee
*Assistant Examiner* — Naomi M Wolford
(74) *Attorney, Agent, or Firm* — Knobbe Martens Olson & Bear LLP

(57) ABSTRACT

This disclosure provides systems, methods, and apparatus for providing illumination for lighting systems. One or more light emitters can be disposed about a longitudinal axis, such as in an at least partial polygonal shape, so that the light sources emit light radially outwardly away from the longitudinal axis. A collimating reflector can be disposed radially outward of the one or more light emitters and can be configured to at least partially collimate the light and to substantially preserve etendue of the light emitted from the light emitters. The one or more light emitters can substantially fill an input aperture of the collimating reflector in a direction of the longitudinal axis. The light can be coupled into a light guide, which can be configured to distribute the light to a target lighting area.

37 Claims, 17 Drawing Sheets

(56) References Cited

U.S. PATENT DOCUMENTS

| | | | |
|---|---|---|---|
| 7,293,906 B2 | 11/2007 | Mok et al. | |
| 7,314,291 B2 | 1/2008 | Tain et al. | |
| 7,407,313 B2 | 8/2008 | Schardt et al. | |
| 7,497,608 B2 | 3/2009 | Wheatley et al. | |
| 7,517,103 B2 | 4/2009 | Furuya et al. | |
| 7,538,340 B2 | 5/2009 | Pang et al. | |
| 7,594,745 B2 * | 9/2009 | Chang | 362/625 |
| 7,614,775 B2 | 11/2009 | Iwasaki | |
| 7,736,044 B2 | 6/2010 | Chew et al. | |
| 7,832,878 B2 | 11/2010 | Brukilacchio et al. | |
| 7,887,216 B2 | 2/2011 | Patrick | |
| 7,889,430 B2 * | 2/2011 | El-Ghoroury et al. | 359/641 |
| 7,905,635 B2 | 3/2011 | Boonekamp et al. | |
| 7,946,721 B2 | 5/2011 | Chang | |
| 7,997,781 B2 | 8/2011 | Kanade et al. | |
| 8,003,998 B2 | 8/2011 | Bogner et al. | |
| 8,071,990 B2 | 12/2011 | Bogner et al. | |
| 8,309,969 B2 | 11/2012 | Suehiro et al. | |
| 2002/0015124 A1 | 2/2002 | Sato et al. | |
| 2003/0206416 A1 * | 11/2003 | Mullally et al. | 362/431 |
| 2003/0235050 A1 * | 12/2003 | West et al. | 362/327 |
| 2005/0007756 A1 | 1/2005 | Yu et al. | |
| 2005/0128724 A1 * | 6/2005 | Choi et al. | 361/803 |
| 2006/0012542 A1 | 1/2006 | Alden | |
| 2006/0056166 A1 | 3/2006 | Yeo et al. | |
| 2006/0209541 A1 * | 9/2006 | Peck | 362/247 |
| 2006/0268551 A1 | 11/2006 | Mok et al. | |
| 2008/0049445 A1 | 2/2008 | Harbers et al. | |
| 2008/0055518 A1 | 3/2008 | Jung | |
| 2008/0084602 A1 | 4/2008 | Xu et al. | |
| 2008/0170178 A1 | 7/2008 | Kubota et al. | |
| 2009/0086508 A1 | 4/2009 | Bierhuizen | |
| 2009/0323144 A1 | 12/2009 | Gruhlke et al. | |
| 2010/0033988 A1 | 2/2010 | Chiu et al. | |
| 2010/0053959 A1 | 3/2010 | Ijzerman et al. | |
| 2010/0091507 A1 * | 4/2010 | Li et al. | 362/470 |
| 2010/0134722 A1 | 6/2010 | Huang et al. | |
| 2010/0183333 A1 | 7/2010 | Kim et al. | |
| 2010/0201916 A1 | 8/2010 | Bierhuizen | |
| 2010/0208488 A1 | 8/2010 | Luo | |
| 2010/0220478 A1 * | 9/2010 | Fields et al. | 362/237 |
| 2010/0226118 A1 | 9/2010 | Baar | |
| 2010/0315826 A1 | 12/2010 | Anderson et al. | |
| 2010/0315833 A1 | 12/2010 | Holman et al. | |
| 2011/0013417 A1 | 1/2011 | Saccomanno et al. | |
| 2011/0044059 A1 | 2/2011 | Inoue et al. | |
| 2011/0096570 A1 | 4/2011 | Vissenberg et al. | |
| 2011/0107587 A1 | 5/2011 | Kolb | |
| 2011/0164202 A1 | 7/2011 | Shiraishi et al. | |
| 2011/0175533 A1 | 7/2011 | Holman et al. | |
| 2011/0182086 A1 | 7/2011 | Mienko et al. | |
| 2012/0014127 A1 | 1/2012 | Kanade et al. | |
| 2013/0278611 A1 | 10/2013 | Holman | |
| 2013/0278612 A1 | 10/2013 | Holman et al. | |
| 2013/0278846 A1 | 10/2013 | Holman et al. | |

FOREIGN PATENT DOCUMENTS

| | | |
|---|---|---|
| JP | 2011243512 A | 12/2011 |
| WO | 0186198 A1 | 11/2001 |
| WO | 2009099547 A2 | 8/2009 |
| WO | 2011004306 A1 | 1/2011 |
| WO | 2011065705 A2 | 6/2011 |

OTHER PUBLICATIONS

International Search Report and Written Opinion—PCT/US2013/037645—ISA/EPO—Jul. 4, 2013.

Lee J. H. et al., "LED Light Coupler Design for a Ultra Thin Light Guide," Journal of the Optical Society of Korea, Sep. 2007, vol. 11, No. 3, pp. 1-5.

Peng C., et al., "A High Power Light Emitting Diode Module for Projection Display Application," 2010 11th International Conference on Electronic Packaging Technology & High Density Packaging, 2010, pp. 1412-1416.

Yu X.J., et al., "LED-Based Projection Systems," Journal of Display Technology, Sep. 2007, vol. 3 (3), pp. 295-303.

* cited by examiner

ILLUMINATION SYSTEMS AND METHODS

TECHNICAL FIELD

This disclosure relates to systems and methods for providing illumination, such as for lighting a room or task area.

DESCRIPTION OF THE RELATED TECHNOLOGY

Various types of lighting systems are available for lighting a room or task area. Some available lighting systems suffer from drawbacks such as non-uniform illumination, wasted light that is directed away from the task area, or other inefficiencies.

SUMMARY

The systems, methods, and devices of the disclosure each have several innovative aspects, no single one of which is solely responsible for the desirable attributes disclosed herein.

One innovative aspect of the subject matter described in this disclosure can be implemented in a light source that includes a set of one or more light emitters disposed about a longitudinal axis (e.g., in an at least partial polygonal shape). The one or more light emitters can be oriented to output light radially outwardly away from the longitudinal axis. The light source can include a collimating reflector, which can be disposed radially outward of the light emitters. All or part of the collimating reflector can be configured to at least partially collimate light output by the one or more light emitters. All or part of the collimating reflector can be configured to substantially preserve etendue of the light output by the one or more light emitters. The one or more light emitters can substantially fill an input aperture of the collimating reflector in a direction of the longitudinal axis. In some implementations, the at least partial collimation is greatest for light propagating in planes containing the longitudinal axis.

The light emitters can be disposed about the longitudinal axis in a closed polygonal shape. The light emitters can face radially outwardly over a circumference of about 360°. The light emitters can be disposed about the longitudinal axis in a partial polygonal shape. The light emitters can face radially outwardly over a circumference of about 180° or less, or of about 90° or less. The polygonal shape can include at least eight sides. In some implementations, the one or more light emitters can be disposed in a substantially circular shape about the longitudinal axis.

The light emitters can include light sources having different colors combinable to produce white light. The light emitters can include at least one of light emitting diode (LED) chips, pre-packaged light emitting diode (LED) chips, organic light emitting diodes (OLEDs), and phosphor layers.

One innovative aspect of the subject matter described in this disclosure can be implemented in a lighting system that includes a light guide plate, and the light source positioned to direct the at least partially collimated light from the light source into the light guide plate. The light guide plate can have a generally circular shape and the light source can be positioned at substantially a center of the light guide plate. For example, the light guide plate can have an inner perimeter and an outer perimeter, and an output aperture of the light source can be optically coupled to the inner perimeter of the light guide plate. The light source can be positioned proximate to the perimeter of the light guide plate, in some implementations.

The light guide plate can include light extraction elements configured to direct light out of the light guide plate. The light extraction elements can be configured to direct light out of the light guide plate with a generally uniform distribution. The light extraction elements can be disposed on one or more of a top side and a bottom side of the light guide plate, and the light extraction elements can be disposed between an inner perimeter and an outer perimeter of the light guide plate, and the light extraction elements can be configured to direct light out of the light guide plate from an output face bounded by the inner and outer perimeters.

In some implementations, the lighting system can include a plurality of the light sources at a plurality of locations across the light guide plate.

In some implementations, a rotation mechanism can be configured to rotate the one or more light emitters about the longitudinal axis to substantially evenly distribute the light output by the one or more light emitters.

The light source can include an opening behind the one or more light emitters and a heat removal element configured to remove heat from the one or more light emitters through the opening. The heat removal element can include a fan configured to direct air flow through the opening or a heat pipe that extends through the opening. The heat removal element can include one or more fins extending into the opening. The fins can be coupled to the one or more light emitters and can be configured to remove heat from the one or more light emitters.

The light source can include at least one optical element proximate to an outer perimeter of the collimating reflector. The optical element can be configured to modify the at least partially collimated light. The optical element can include at least one of a phosphor containing layer and a color filter. The light source can include a lens proximate to an outer perimeter of the collimating reflector, and the lens can be configured to modify the at least partially collimated light.

One innovative aspect of the subject matter described in this disclosure can be implemented in a light source that includes means for emitting light. The light emitting means is disposed about a longitudinal axis (e.g., in an at least partial polygonal shape) and is oriented to output light radially outwardly away from the longitudinal axis. The light source can include means for at least partially collimating the light output by the light emitting means. The at least partially collimating means can be disposed radially outward of the light emitting means. All or part of the at least partially collimating means can be configured to substantially preserve etendue of the light output by the light emitting means. The light emitting means can substantially fill an input aperture of the at least partially collimating means in a direction of the longitudinal axis. In some implementations, the partial collimation can be greatest for light propagating in planes containing the longitudinal axis.

The light emitting means can include one or more light emitters. The at least partially collimating means can include a collimating reflector. The light emitting means can include at least one of light emitting diode (LED) chips, pre-packaged light emitting diode (LED) chips, organic light emitting diodes (OLEDs), and phosphor layers. The light emitting means can include light sources having different colors combinable to produce white light.

One innovative aspect of the subject matter described in this disclosure can be implemented in a lighting system that includes means for guiding light and the light source positioned to direct the at least partially collimated light from the light source into the light guiding means.

The light guiding means can include light extraction elements configured to direct light out of the light guiding means. The light guiding means can include a light guide plate.

In some implementations, a rotation mechanism can be configured to spin the light emitting means about the longitudinal axis to substantially evenly distribute the light output by the light emitting means.

One innovative aspect of the subject matter described in this disclosure can be implemented in a method of making a light source. The method can include providing a one or more light emitters disposed about a longitudinal axis (e.g., in an at least partial polygonal shape) and the light emitters oriented to output light radially outwardly away from the longitudinal axis, and coupling a collimating reflector radially outward of the one or more light emitters. The one or more light emitters can substantially fill an input aperture of the collimating reflector in a direction of the longitudinal axis. All or part of the collimating reflector can be configured to at least partially collimate the light output by the one or more light emitters. All or part of the collimating reflector can be configured to substantially preserve etendue of the light. In some implementations, the partial collimation can be greatest for light propagating in planes containing the longitudinal axis.

The method can include coupling a light guide plate to the collimating reflector, and the light guide plate can be configured to receive the at least partially collimated light.

The method can include coupling a rotation mechanism to the one or more light emitters, and the rotation mechanism can be configured to rotate the one or more light emitters about the longitudinal axis to substantially evenly distribute the light output by the one or more light emitters.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following detailed description is directed to certain implementations for the purposes of describing the innovative aspects. However, the teachings herein can be applied in a multitude of different ways. The described implementations may be implemented in various lighting systems such as, but not limited to, overhead lighting systems, commercial lighting systems, task lighting systems, residential lighting systems, industrial lighting systems, outdoor lighting systems, floor lighting systems, etc. Thus, the teachings are not intended to be limited to the implementations depicted solely in the Figures, but instead have wide applicability as will be readily apparent to a person having ordinary skill in the art.

A lighting system or illumination system can be used to provide light in a predetermined range of useful angular directions from one or more light sources. In some system implementations, a light source can input light into a light guide that is configured to output the light distributed across a specified lighting area. In some lighting systems, one or more light emitters can be directly optically coupled to a light guide, and for some light emitters having a wide angle of light output, some light can enter the light guide at angles that do not allow the light to be guided in the light guide, thereby possibly reducing the brightness and/or efficiency of the lighting system. In some of these cases, light that is not guided in the light guide can exit the light guide at a location (or locations) near the light guide input, possibly producing a bright area (or areas) near the input, thereby decreasing uniformity of the light output by the lighting system. In some implementations disclosed herein, a light source can include collimating optics disposed between the light emitter and the light guide configured to at least partially collimate light directed from the light emitter to the light guide. The light source can be configured to at least partially collimate light propagating in planes orthogonal to the plane output surface of the light guide and not collimate light in the plane parallel to the light guide's plane output surface. The light source can be configured to emit light radially outwardly. Particular implementations of the subject matter described in this disclosure can be implemented to realize one or more of the following potential advantages. The uniformity of light and the brightness of the lighting system can both be increased by use of the collimating optics. The light source can be used to provide generally uniform illumination radially across a circumference, which can be a full 360° in some cases or fractions of 360° in some cases. In some implementations, the light source can be used to directly light an area without using a light guide.

Figure 1A:
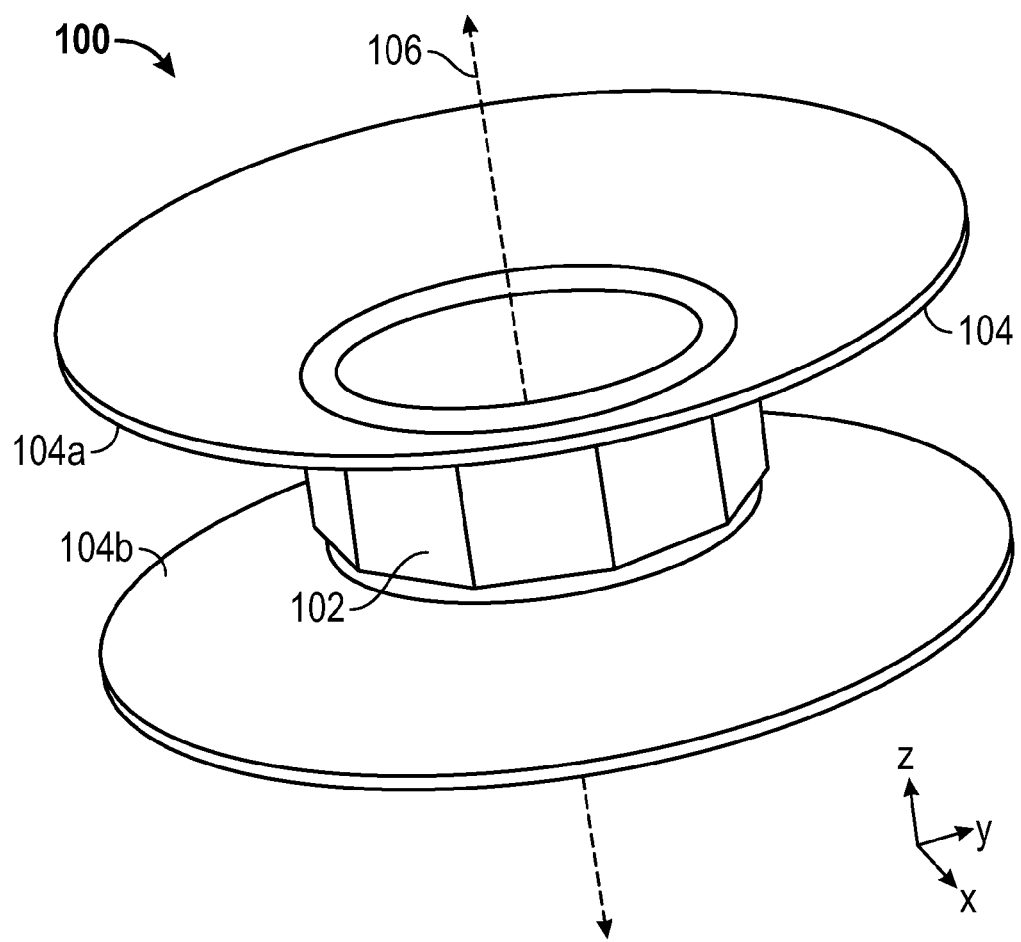
FIG. 1A shows an isometric view of an example implementation of a light source.
Figure 1B:
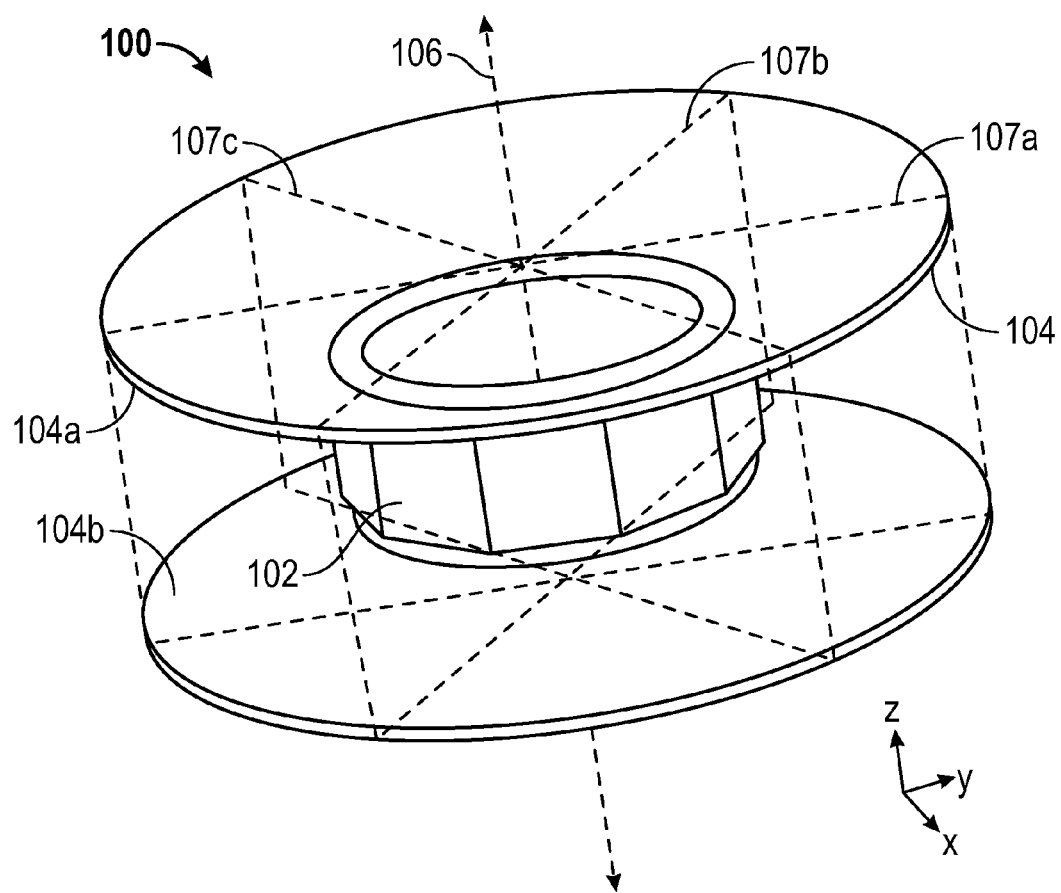
FIG. 1B shows another isometric view of the light source of FIG. 1A showing multiple planes of collimation.

FIG. 1A shows an isometric view of an example implementation of a light source 100. The light source 100 may be a conically light emitting light source 100. The light source 100 includes one or more light emitters 102. The light emitters 102 (e.g., surface-emitting light emitters) can include, for example, light emitting diode (LED) chips, pre-packaged light emitting diode (LED) chips, LEDs with phosphor layers, organic light emitting diodes (OLEDs), and the like. The light emitters 102 are disposed in an at least partial polygonal shape about a longitudinal axis 106 so that the light emitting surfaces of the light emitters 102 are oriented to output light radially outwardly away from the longitudinal axis 106. The light source 100 includes an arcuate collimating reflector 104, and all or part of the collimating reflector 104 can be configured to at least partially collimate light output by the light emitters 102. The reflector 104 includes an upper or first reflector portion 104a and a lower or second reflector portion 104b. Although the light source 100, as well as various other implementations discussed herein, can be oriented differently than shown in the illustrated implementations, the terms upper, upward, above, top, etc., are used herein to generally refer to an increase or relatively high value in the z-direction, and the terms lower, downward, below, bottom, etc. are used herein to generally refer to a decrease or relatively low value in the z-direction. The particular orientations shown in the illustrated implementations are provided merely as examples. As described in greater detail elsewhere herein, the reflector 104 can be configured to at least partially collimate light propagating from the light emitters 102 in planes that contain the longitudinal axis 106 (e.g., the xz-plane and the yz-plane). FIG. 1B shows another isometric view of the light source 100 of FIG. 1A showing multiple planes of collimation. The collimating reflector 104 can be configured to at least partially collimate light propagating along planes that contain the longitudinal axis 106, such as planes 107a, 107b, and 107c, shown in FIG. 1B. Although FIG. 1B shows only three example planes that contain the longitudinal axis 106, the reflector 104 can at least partially collimate light propagating along many other planes that contain the longitudinal axis 106. The reflector 104 can decrease divergence of the light away from a plane (the xy-plane) that is perpendicular (or substantially perpendicular) to the longitudinal axis 106, thereby collimating the light towards the plane (the xy-plane) that is perpendicular (or substantially perpendicular) to the longitudinal axis 106. All or part of the reflector 104 can be configured to substantially preserve etendue (e.g., to preserve etendue) of the light output by the light emitters 102.

Figure 2A:
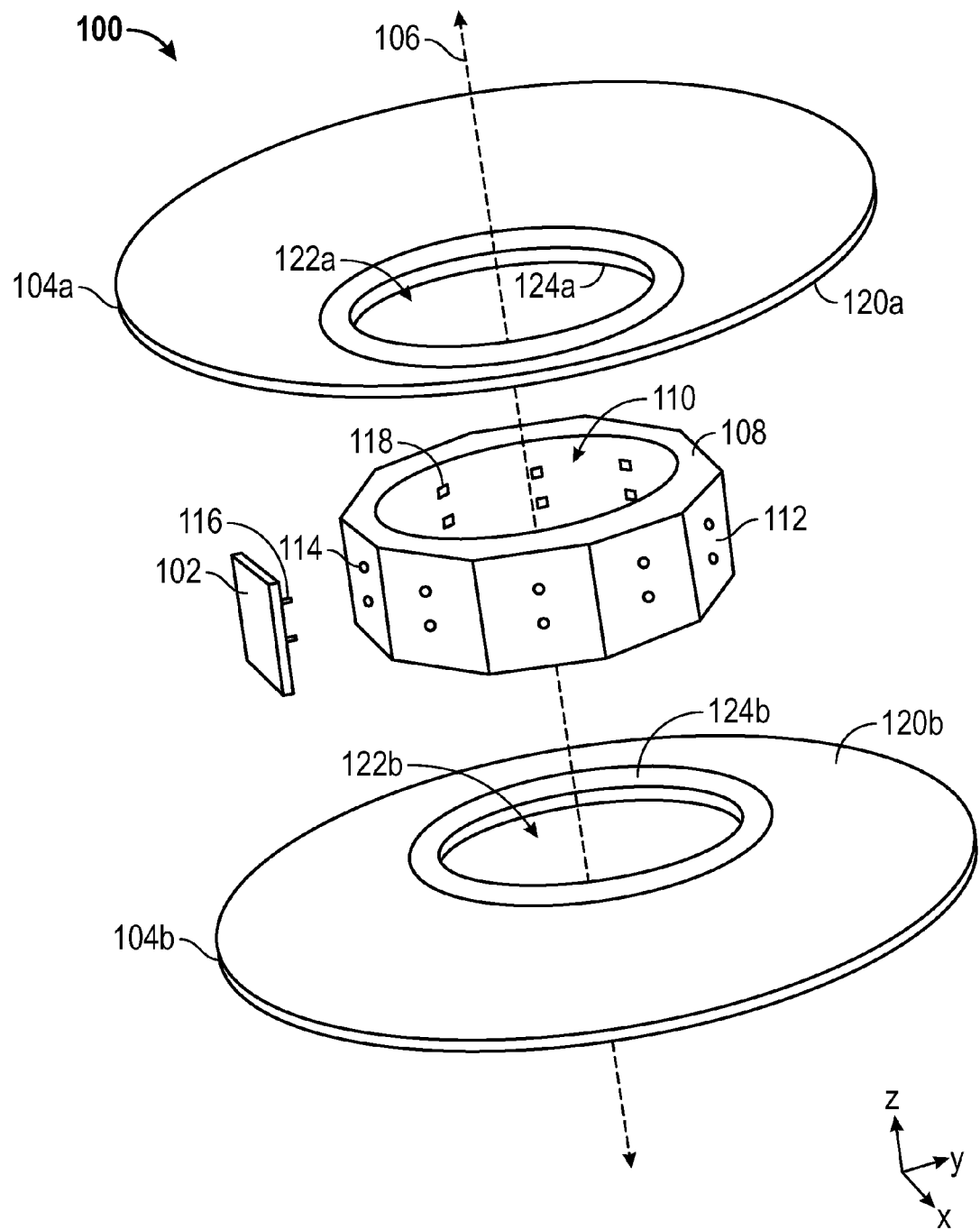
FIG. 2A shows an example of an exploded isometric view of the light source of FIG. 1A.
Figure 3:
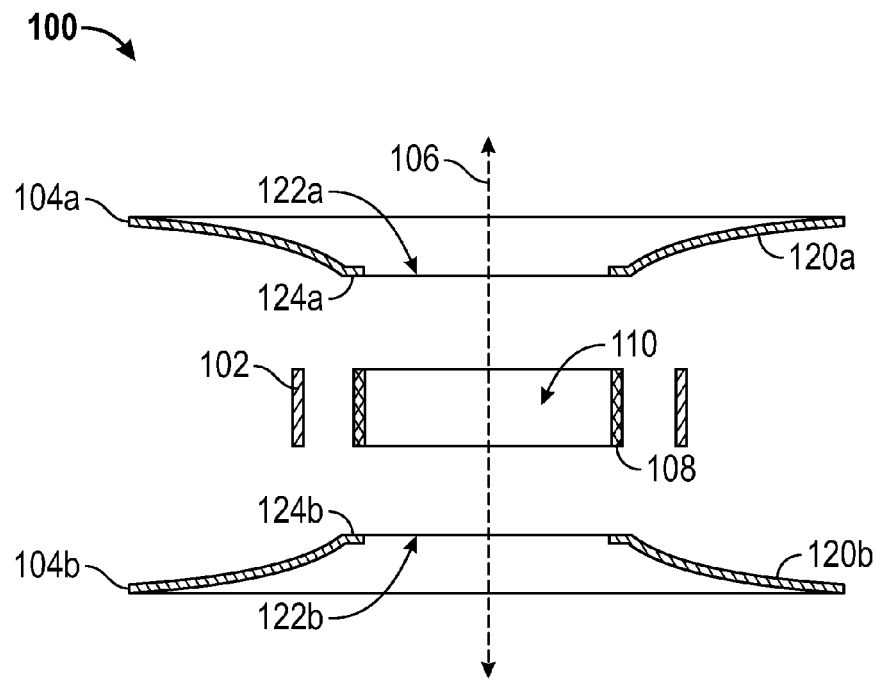
FIG. 3 shows an example cross-sectional exploded view of the light source of FIG. 1A taken through the longitudinal axis.
Figure 3:
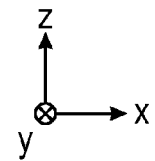

FIG. 2A shows an example of an exploded isometric view of the light source 100 of FIG. 1A. FIG. 3 shows an example cross-sectional exploded view of the light source 100 of FIG. 1A taken through the longitudinal axis 106. A centerpiece 108 can be positioned between the upper reflector portion 104a and the lower reflector portion 104b. The center piece 108 can have a hole 110 extending therethrough, which can be aligned with the longitudinal axis 106. The center piece 108 can include a plurality of radially outwardly facing surfaces 112 disposed around the longitudinal axis 106 and facing generally radially away from the longitudinal axis 106. In the implementation illustrated in FIG. 2A, the center piece 108 includes 10 surfaces 112 forming a 10-sided polygonal shape. Other shapes can also be used, for example, having 6, 8, 12, 14, 16, 20, or any suitable number of sides. In some implementations, a larger number of sides can increase the uniformity of the distribution of light output by the light source 100. For another example, the surfaces 112 can form a regular polygon, or the surfaces 112 can vary in width, joint angle, etc.

Figure 2B:
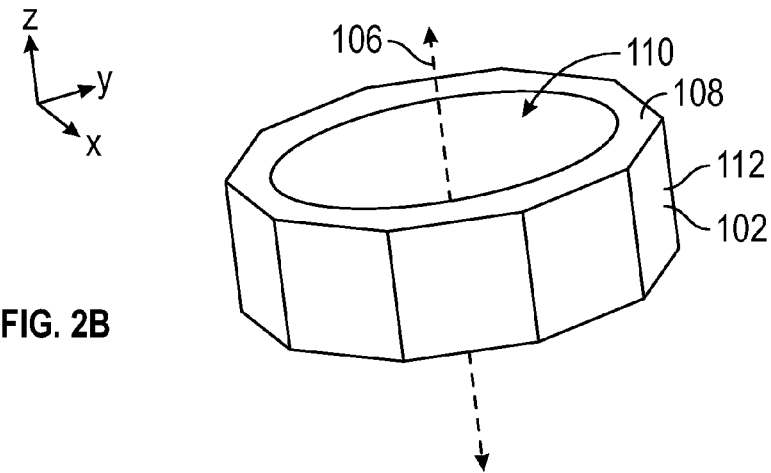
FIG. 2B shows an example implementation of one or more light emitters configured to emit light radially outwardly from the longitudinal axis.

FIG. 2B shows an example implementation of one or more light emitters 102 configured to emit light radially outwardly from the longitudinal axis 106. The one or more light emitters 102 shown in FIG. 2B can be incorporated into a light source 100, for example, as the center piece 108 shown in FIG. 2A. In some implementations, a plurality of light emitters 102 can be disposed about the longitudinal axis 106 (e.g., on the outwardly facing surfaces 112 of the center piece 108) to emit light radially outwardly from the longitudinal axis 106. In some implementations, a single light emitter 102 can be fabricated or applied such that different portions of the light emitter 102 face in different directions so that the light emitter 102 emits light radially outwardly from the longitudinal axis 106. In some implementations, the one or more light emitters 102 can substantially fill the outwardly facing surfaces 112 (e.g., in the direction of the longitudinal axis 106 (e.g., the z-direction) and/or in the circumferential direction across the surfaces 112 in the xy-plane). In some implementations, manufacturing tolerances or design limitations may limit the amount of the surfaces 112 that can be filled by the one or more light emitters 102. For example, in some implementations, the one or more light emitters 102 can fill the surfaces 112 by at least about 90% or by at least about 95%.

Figure 2C:
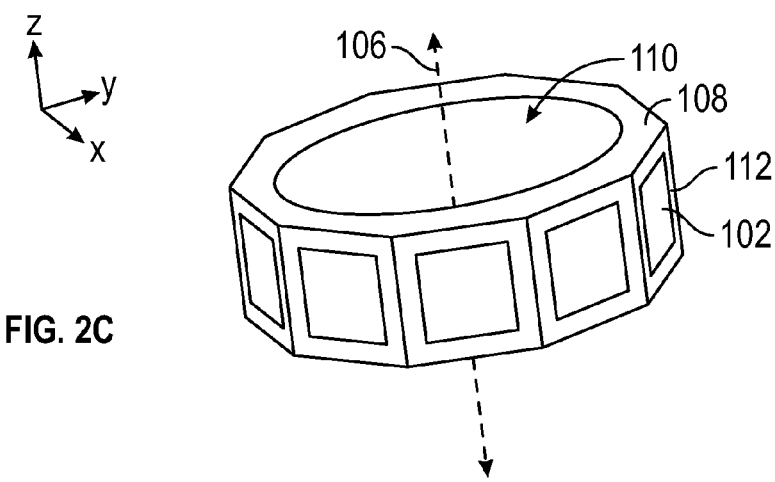
FIG. 2C shows an example implementation of one or more light emitters spaced apart and configured to emit light radially outwardly from the longitudinal axis.

FIG. 2C shows an example implementation of one or more light emitters 102 spaced apart and configured to emit light radially outwardly from the longitudinal axis 106. The one or more light emitters 102 shown in FIG. 2C can be incorporated into a light source 100, for example, as the center piece 108 shown in FIG. 2A. As shown in FIG. 2C, the light emitters 102 can be spaced apart from each other in the circumferential direction in the xy-plane and/or the light emitters 102 can be spaced apart from the top and/or bottom ends of the surfaces 112 of the polygonal shape in the z-direction. In some implementations, the light emitters 102 can fill less than about 95%, or less than about 90%, or less than about 85%, or less than about 80%, or less than about 75% of the corresponding surfaces 112. The light emitters 102 can be spaced apart from all sides of the surfaces 112 of the polygonal shape, as shown in FIG. 2C, or the light emitters 102 can be near or adjacent to one or more sides of the surfaces 112 while being spaced apart from one or more other sides of the surfaces 112. In some implementations, different light emitters 102 can have different configurations (e.g., filling different amounts of the corresponding surfaces 112).

Figure 2D:
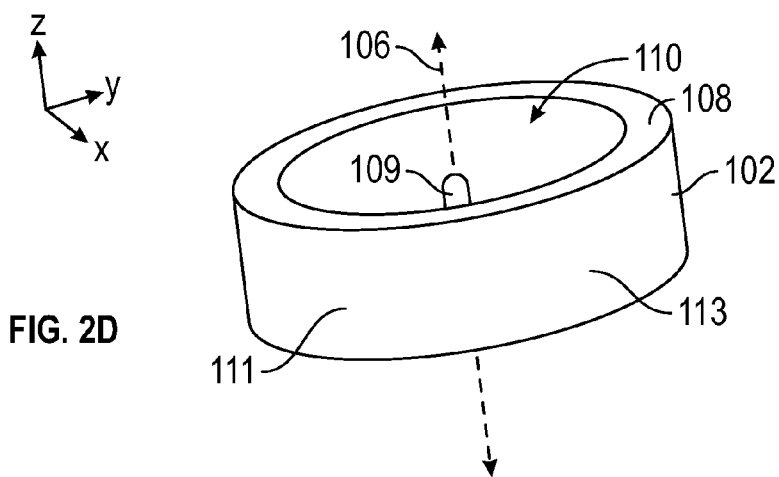
FIG. 2D shows another example implementation of one or more light emitters configured to emit light radially outwardly from the longitudinal axis.

FIG. 2D shows another example implementation of one or more light emitters 102 configured to emit light radially outwardly from the longitudinal axis 106. The one or more light emitters 102 shown in FIG. 2D can be incorporated into a light source 100, for example, as the center piece 108 shown in FIG. 2A. In some implementations, the one or more light emitters 102 can include a curved light emitting surface 113, which can be an at least partially polygonal shape having an infinite number of sides. In some cases, the curved light emitting surface 113 can extend across substantially the entire circumference of the light source 100 as a single continuous arcuate member, or across only a portion of the circumference of the light source 100. In some cases, multiple distinct arcuate members can be used to extend across the circumference of the light source 100. In some implementations, a lighting element 109, such as a light emitting diode (LED), can be positioned radially inwardly from the light emitting surface 113 (e.g., on the longitudinal axis 106 at substantially the center of the light source 100) so light from the lighting element 109 can be emitted radially outwardly from the longitudinal axis 106 through the light emitting surface 113. In some implementations, a phosphor 111 (e.g., a yellow or yellow-green phosphor) can at least partially surround the lighting element 109 (which can be a blue LED), and the radially outer surface of the phosphor 111 can form the light emitting surface 113. The phosphor 111 can receive light propagating from the lighting element 109, and the phosphor 111 can emit white light or substantially white light. The phosphor 111 can have an arcuate or annular shape. In some implementations, the phosphor 111 can have a polygonal shape that has distinct sides (e.g., as shown in FIG. 2B). A hole 110 can be defined inside the phosphor 111 and the lighting element 109 can be positioned in the hole 110, spaced apart from the phosphor 111. In some implementations, the phosphor 111 can extend radially inwardly further than as shown in FIG. 2D, and extend to a location near or adjacent to the lighting element 109, e.g., so that light emitted by the lighting element 109 can be coupled into the phosphor 111 without passing through or substantially without passing through an air gap. Various other implementations disclosed herein can be modified to have a curved light emitting surface 113, e.g., similar to that shown in FIG. 2D.

With reference again to FIG. 2A, the surfaces 112 can include engagement features 114 configured to engage corresponding engagement features 116 on the light emitters 102. In FIG. 2A, only a single light emitter 102 is show for simplicity and the light emitter 102 is shown disengaged from the center piece 108 to illustrate the engagement features 114 and 116. The engagement features 114 and 116 can be configured to secure the light emitters 102 to the surfaces 112 of the center piece 108. The engagement features 114 and 116 can include snap-fit features, friction-fit features, clamps, and/or various other features suitable for securing objects to each other. The light emitters 102 can be secured to the centerpiece 108 in various other manners as well, such as, for example, adhesive layers. The engagement features 114 and 116 can be configured to provide power and/or control signals to the light emitters 102. The center piece 108 can include channels 118 configured to allow electrical cables (not shown) to pass through the center piece 108 and connect to the light emitters 102 to provide power and/or control signals to the light emitters 102. The electrical cables can enter the light source 100 through the hole 110 and pass through the channels 118 to provide an electronic communication link to the light emitters 102.

The upper reflector portion 104a and the lower reflector portion 104b can include reflective surfaces 120a and 120b, respectively, that are configured to at least partially collimate light as discussed herein. The reflector portions 104a and 104b can also include holes 122a and 122b formed therein, which can align with the longitudinal axis 106. In some implementations, the holes 122a and/or 122b can have substantially the same shape as the hole 110 formed in the center piece 108, so that, when the light source 100 is assembled, the holes 110, 122a, and 122b can form a through hole that extends through the entire light source 100 (e.g., generally centered on the longitudinal axis). In some implementations, one or both of the reflector portions 104a and 104b can include a solid area instead of the hole 122a or 122b. In some implementations, the center piece 108 can be generally solid and the hole 110 can be omitted. In some such implementations, the channels 118 can run through more of the light source 100 than shown to provide electronic communication links to the light emitters 102. In some cases, one of the reflector portions 104a or 104b can have a solid area instead of the hole 122a or 122b, and the other reflector portion 104a or 104b can include the hole 122a or 122b, thereby forming a recess that does not extend completely through the light source 100. The center piece 108 can include a recess rather than the hole 110, in some implementations. As discussed in greater detail elsewhere herein, in some implementations, the hole 110 can be used for heat removal.

The reflector portions 104a and 104b can include engagement surfaces 124a and 124b, respectively, configured to facilitate attachment of the reflector portions 104a and 104b to the center piece 108. For example, the engagement surfaces 124a and 124b can be substantially flat so as to align face-to-face with the corresponding top and bottom surfaces of the center piece 108. In some implementations, the surfaces 124a and 124b and the top and bottom surfaces of the center piece 108 can include corresponding features that can engage to align the reflector portions 104a and 104b at a particular orientation with respect to the center piece 108. The center piece 108 and/or the reflector portions 104a and 104b can include engagement features that are configured to secure the reflector portions 104a and 104b to the center piece 108, or in some cases an adhesive or any other suitable securing mechanism can be used.

Many variations are possible. For example, although the center piece 108 is shown with generally solid sides (e.g., indicating a monolithic structure), in some implementations, the center piece 108 can be a framework construction with generally open portions. The center piece 108 can be integrally formed with one or both of the reflector portions 104a and 104b. In some cases, the light emitters 102 can be integrated with the center piece 108. For example, the center piece 108 can include circuit board features with LED chips formed on the surfaces 112.

Figure 4:
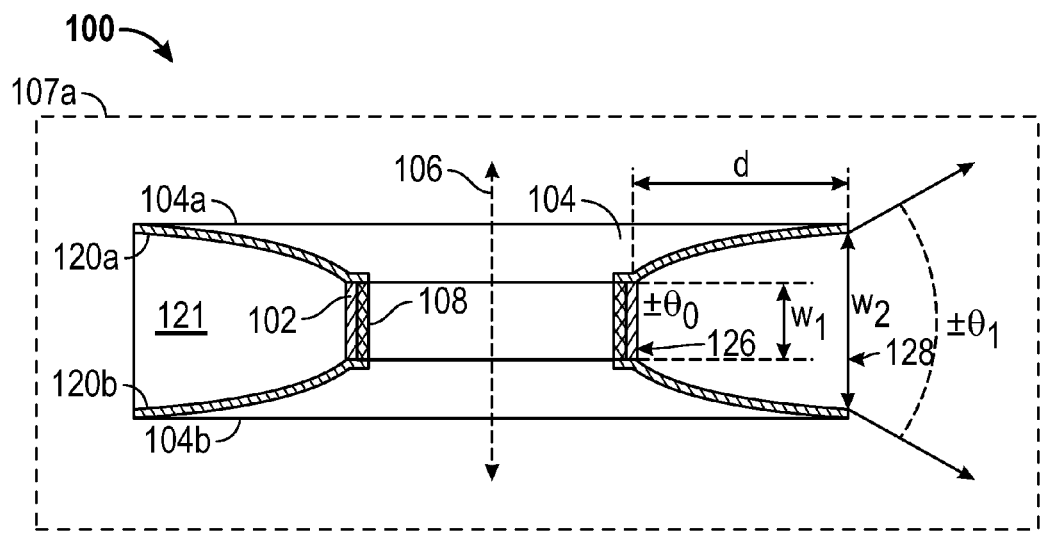
FIG. 4 shows an example cross-sectional view of the light source of FIG. 1A taken through the longitudinal axis.
Figure 4:
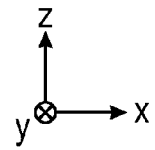

FIG. 4 shows an example cross-sectional view of the light source 100 of FIG. 1A taken through the longitudinal axis 106. The reflector 104 can be configured to at least partially collimate light such that light exiting the reflector 104 has an emission distribution across the z-direction of $\pm\theta_1$, which can be, for example, about ±60°, about ±45°, about ±40°, about ±35°, about ±35°, about ±25°, about ±20°, greater than about ±60°, less than about ±20°, between about ±60° and about ±20°, between about ±40° and about ±25°, and the like. In some implementations, the at least partially collimated light can have a substantially sharp cutoff at the ends of the emission distribution, as opposed to the soft, gradual fade of Lambertian distribution. A plane of collimation 107a that intersects the longitudinal axis 106 is shown in FIG. 4. As can be seen in FIG. 4, the upper reflector portion 104a can include a reflective surface 120a that faces generally downward (in the illustrated orientation) or towards the lower reflector portion 104b. The reflective surface 120a can be a mathematically shaped surface and can conform or substantially conform, for example, to a portion of a parabola in the xz-plane (and, in some cases, in all other planes containing the z-axis (or longitudinal axis 106), such as the yz-plane). The lower reflector portion 104b can include a reflective surface 120b that faces generally upward (in the illustrated orientation) or towards the lower reflector portion 104b. The reflective surface 110b can be a mathematically shaped surface and can conform or substantially conform, for example, to a portion of a parabola in the xz-plane (and, in some cases, in all other planes containing the z-axis (or longitudinal axis 106), such as the yz-plane). The upper reflector portion 104a and the lower reflector portion 104b can be spaced apart, forming an input aperture 126 at the radially inner end of the reflective surfaces 120a and 120b and an output aperture 128 at the radially outer end of the reflective surfaces 120a and 120b. The input aperture 126 can have a width $w_1$ along the z-axis that is smaller than a width $w_2$ of the output aperture 128 along the z-axis. The area between the reflective surfaces 120a and 120b can be empty or filled with air or another gas. In some implementations, the area between the reflective surfaces 120a and 120b can include (e.g., be at least partially filled, substantially filled, or filled with) a material 121 such as a generally optically transparent material (e.g., glass or plastic). In some implementations, the material 121 can be a dielectric material.

The reflector 104 can be a substantially etendue-preserving (e.g., etendue-preserving) reflector. In some implementations, the mathematical shapes of the reflective surfaces 120a and/or 120b can be governed by Sine Law reflector design. For example, if the light emitter 102 outputs light over a width $w_1$ (at the input aperture 126) and an emission distribution of $\pm\theta_0$ and light exits the reflector 104 over a width $w_2$ (at the output aperture 128) and an emission distribution of $\pm\theta_1$, then $w_1 \times \sin\theta_0$ can equal or substantially equal $w_2 \times \sin\theta_1$, and the distance d between the input aperture 126 and the output aperture 128 can equal or substantially equal $0.5 \times (w_1+w_2)/\tan\theta_1$. In an implementation in which the emission distribution $\pm\theta_0$ of the light emitter 102 is about ±90° (e.g., Lambertian distribution), $w_1 \times \sin\theta_0$ is $w_1 \times \sin 90°$, which second factor approaches unity, and thus $w_1$ can equal or substantially equal $w_2 \times \sin\theta_1$. In an implementation of metal reflecting surfaces 120a and 120b filled with a dielectric material 121 (e.g., having a refractive index of about 1.47), in which the emission distribution $\pm\theta_0$ of the light emitter 102 is about ±90°, and the emission distribution $\pm\theta_1$ of the reflector 104 can be about ±25°, the width $w_1$ of the input aperture 126 can be about 1.26 millimeters (mm), the width $w_2$ of the output aperture 128 can be about 3 mm, and the distance d between the input aperture 126 and the output aperture 128 can be about 4.57 mm. Note that, in some implementations, the emission distribution $\pm\theta_1$ of the reflector 104 can range between ±25° and ±48°, or between ±30° and ±35°. Various other dimensions can be selected and calculated using Sine Law. For example, one or more variables may be known, such as the width $w_1$ (e.g., based at least partially on the light emitter 102), the width $w_2$ (e.g., based at least partially on the width of a light guide), the emission distribution $\pm\theta_0$ (e.g., based at least partially on the type of light emitter 102), the emission distribution $\pm\theta_1$ (e.g., based at least partially on the design of the lighting system, based on properties of the light guide, etc.), and the distance d (e.g., based at least partially on the design of the lighting system, etc.), which can allow for calculation of one or more unknown variables.

In some implementations, the light emitter 102 can fill or substantially fill the input aperture 126 along the direction of the longitudinal axis 106 (along the z-axis in FIG. 4). In some implementations, manufacturing tolerances or design limitations can restrict the amount of the input aperture 126 that is filled by the light emitters 102 in the direction of the longitudinal axis 106. For example, the light emitters 102 can substantially fill the input aperture 126 along the direction of the longitudinal axis 106 by at least about 95% or by at least about 90%, in some implementations. The light emitters 102 can substantially fill the input aperture 126 in the direction of the longitudinal axis 106 so that the reflector 104 can substantially preserve etendue of the light propagating from the light emitters 102 along planes that intersect the longitudinal axis 106. In some implementations, the light emitters 102 can emit light across an area that is larger than the input aperture 126 in the longitudinal axis 106, and a portion of the light emitters 102 can be covered (e.g., by the areas of the reflector 104 adjacent to the input aperture 126). Thus, in some implementations, the input aperture 126 can be filled by the light emitters 102 in the direction of the longitudinal axis 106 because the light emitters 102 extend beyond the ends of the input aperture 126.

In the xz-plane, the upper end of the input aperture 126 can be located at substantially the focal point of the parabolic curvature of the lower reflective surface 120b (e.g., at the focal point of the parabolic curvature of the lower reflective surface 120b), and the lower end of the input aperture 126 can be located at substantially the focal point of the parabolic curvature of the upper reflective surface 120a (e.g., at the focal point of the parabolic curvature of the upper reflective surface 120a). The first parabolic curve (associated with the upper reflective surface 120a) can be angled with respect to the second parabolic curve (associated with the lower reflective surface 120b) to form the shape of the reflector 104 in the xz-plane. In some implementations, the reflector cross-sectional shape (e.g., shown in FIG. 4) can be rotated about the longitudinal axis 106 to form the arcuate shape of the reflector 104.

Figure 5:
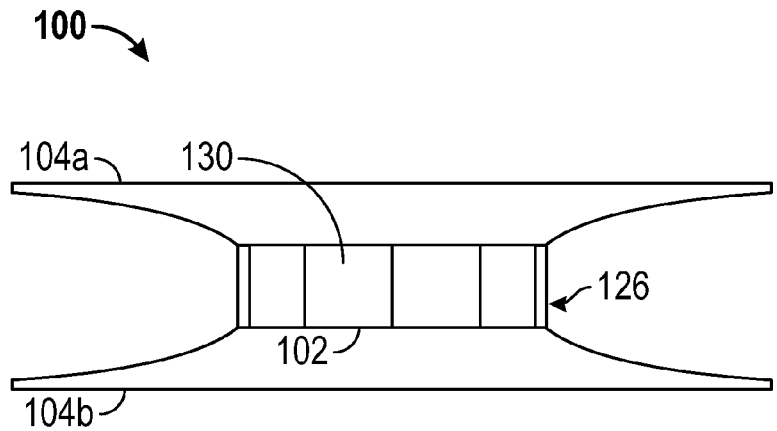
FIG. 5 shows an example side elevational view of the light source of FIG. 1A.
Figure 5:
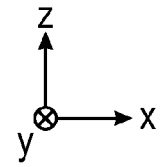

FIG. 5 shows an example side elevational view of the light source 100 of FIG. 1A. The light emitters 102 can be configured to emit white light or substantially white light. In some implementations, the light emitters 102 can include a blue lighting element (e.g., a Citizen CL-435S LED) with a yellow or yellow-green phosphor 130 disposed over the blue lighting element (e.g., LED) so that the phosphor 130 receives light from the blue lighting element, and so that the phosphor 130 emits white light or substantially white light. In some implementations, the radially outer surface of the phosphor 130 can form the light emitting surface of the light emitter 102, and the phosphor 130 can fill or substantially fill the entire input aperture 126 in the z-direction.

Figure 6:
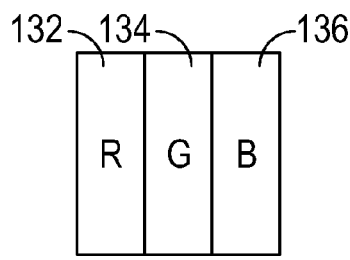
FIG. 6 shows an example lighting arrangement for a polygon face of the light source of FIG. 1A.
Figure 7:
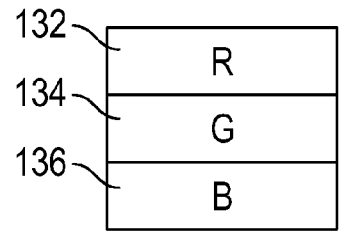
FIG. 7 shows another example lighting arrangement for a polygon face of the light source of FIG. 1A.
Figure 8:
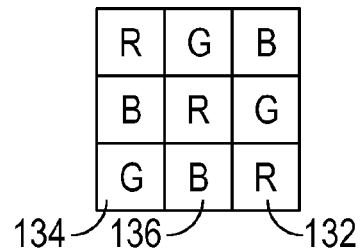
FIG. 8 shows yet another example lighting arrangement for a polygon face of the light source of FIG. 1A.

In some implementations, the light emitter 102 can include multiple lighting elements, which, in some cases, can combine to produce white light or substantially white light. FIG. 6 shows an example lighting arrangement for a polygon face of the light source 100 of FIG. 1A. FIG. 7 shows another example lighting arrangement for a polygon face of the light source 100. FIG. 8 shows yet another example lighting arrangement for a polygon face of the light source 100. In the implementations shown, the light emitter 102 can include one or more red lighting elements 132, one or more green lighting elements 134, and one or more blue lighting elements 136, which can combine to produce white light or substantially white light. Other color combinations can be used (e.g., using cyan, yellow, and magenta) to produce white light or substantially white light or to produce various other colors. In FIG. 6, the lighting elements 132, 134, and 136 are arranged in a side-by-side configuration (e.g., as vertical stripes). In FIG. 7, the lighting elements 132, 134, and 136 are arranged in a top-to-bottom configuration (e.g., as horizontal stripes). In FIG. 8, multiple red lighting elements 132, multiple green lighting elements 134, and multiple blue lighting elements 136 can be used (e.g., in a staggered 3×3 configuration). LEDs, OLEDs, or any suitable lighting elements can be used for the light emitters 102. In some implementations, small spaces or gaps can be positioned between the lighting elements 132, 134, and 136, or between light emitters 102. In some cases, a small space or gap can be positioned at the top or bottom of the light emitters 102 (e.g., formed by a support border around the LED or other lighting element). Nevertheless, as mentioned above, the light emitters 102 can fill or substantially fill the input aperture 126 in the direction of the longitudinal axis 106 (z-direction) such that the light source 100 conforms with Sine Law, as discussed herein.

Figure 9A:
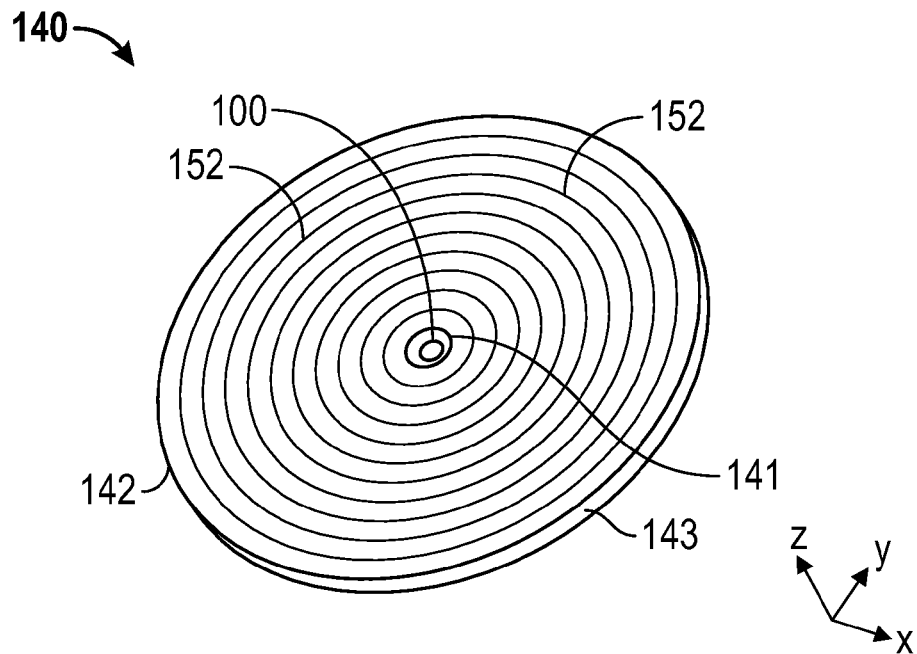
FIG. 9A shows an isometric view of an example implementation of a lighting system including a light source and a light guide.
Figure 9B:
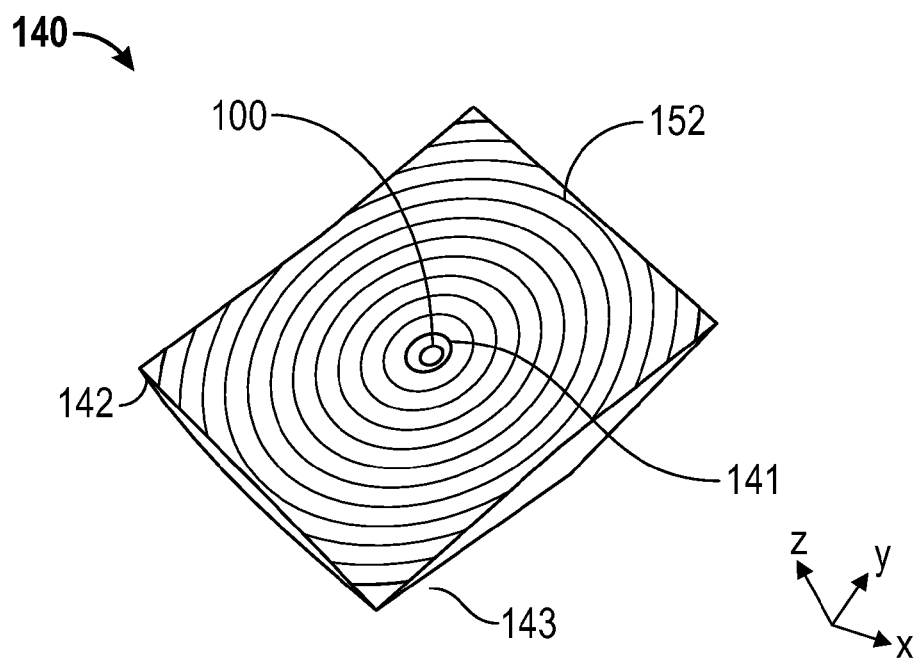
FIG. 9B shows an isometric view of another example implementation of a lighting system including a light source and a light guide.
Figure 10A:
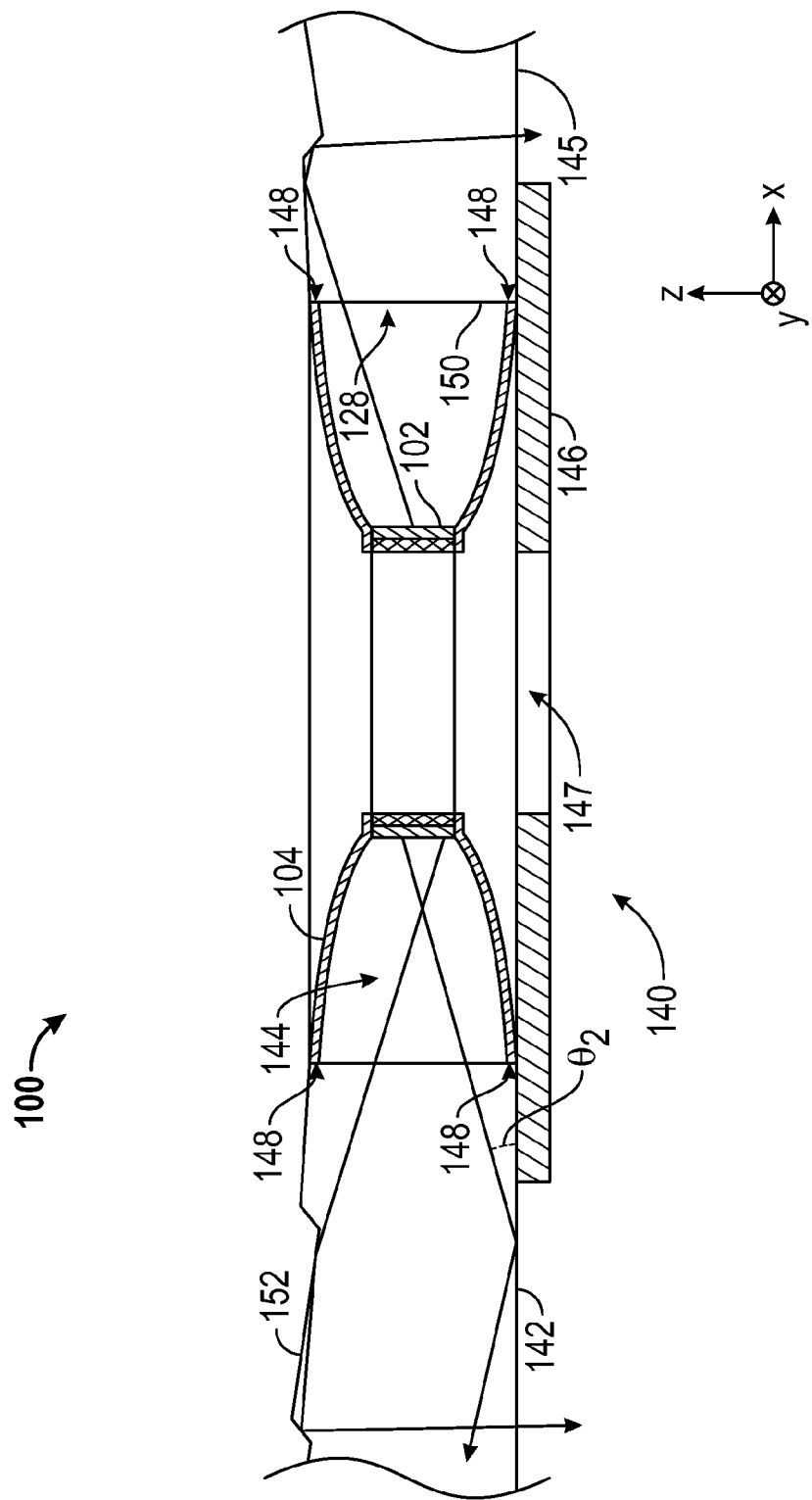
FIG. 10A shows an example cross-sectional view of the lighting system of FIG. 9A or 9B taken through the center of the lighting system in the xz-plane.

FIG. 9A shows an isometric view of an example implementation of a lighting system 140 including a light source 100 and a light guide 142. FIG. 9B shows an isometric view of another example implementation of a lighting system 140 including a light source 100 and a light guide 142. FIG. 10A shows an example cross-sectional view of the lighting system 140 of FIG. 9A or 9B taken through the center of the lighting system 140 in the xz-plane. As shown in FIG. 9A, the light guide 142 can have a generally circular shape (e.g., a circular shape, an elliptical shape, or an oval shape). As shown in FIG. 9B, the light guide plate 142 can have a generally rectangular shape (e.g., a rectangle or square shape), although other polygonal shapes can be used with a different number of sides (e.g., 3 sides, 5 sides, 6 sides, etc.). The light guide 142 can be optically coupled to the light source 100 so that light exiting the light source 100 is input into the light guide 142. The light source 100 can be inwardly spaced from the edge(s) of the light guide 142, and can be positioned at substantially the center of the light guide 142 (e.g., at the center of the light guide 142) to center-feed light into the light guide 142. The light guide 142 can include an inner perimeter 141 and an outer perimeter 143, and the light source 100 can be optically coupled to the inner perimeter 141 of the light guide 142 so that light is directed from the light source into the light guide 142 via the input face 150 of the light guide 142 at the inner perimeter 141 thereof. The light guide 142 can include or be formed of one or more solid materials that are configured to guide light by total internal reflection (TIR), such as polycarbonate, acrylic, glass, and the like. In some implementations, a top surface and a bottom surface of the light guide 142, both of which extending from the inner perimeter 141 to the outer perimeter 143, are substantially parallel. Alternatively, the light guide 142 can be tapered such that the top and bottom surfaces of the light guide 142 are not parallel to each other. In some implementations, the light guide 142 has a critical angle $\theta_2$ that is greater than or equal to the angle of distribution $\theta_1$ of light leaving the reflector 104, such that all or substantially all of the light that exits the reflector 104 of the light source 100 (e.g., a conically light emitting light source 100) and enters the light guide 142 propagates at an angle below the critical angle $\theta_2$ and can be guided by TIR within the light guide 142. The critical angle $\theta_2$ for TIR of the light guide 142 can be, for example, at least about 30°, at least about 40°, less than about 45°, and/or less than about 50°. In some implementations, the critical angle $\theta_2$ can be about 42°. The collimating reflector 104 can reduce the amount of light that enters the light guide 142 at an angle higher than the critical angle $\theta_2$, at which light might otherwise escape the light guide 142 near the input 150 of the light guide 142, creating a bright region that can reduce uniformity of illumination from the light guide 142, and/or can reduce the amount of light input into the light guide 142 that can be turned by the light guide 142, which can affect brightness of the lighting system 140. By limiting the angle $\theta_1$ at which the light is inputted into the light guide 142, the reflector 104 can increase the brightness and/or uniformity of light emitted from the light guide 142, as compared to a Lambertian light source that is optically coupled to the light guide 142 without collimation.

As can be seen in FIG. 10A, the light source 100 can have a thickness that is similar (e.g., equal or substantially equal) in size to the thickness of the light guide 142. In some implementations, the thickness of the combined reflector 104 and light emitters 102 is less than or equal to the thickness of the light guide 142. The light source 100 can be incorporated into a lighting system 140 including a light guide 142 without increasing the thickness of the lighting system 140. The light guide 142 can include a hole 144 that is configured to receive the light source 100. In some implementations, the hole 144 can extend only partially through the light guide material so that the light source 100 can be supported by the bottom of the hole 144. In some implementations, a support member 146 can be attached (e.g., adhered) to a side of the light guide 142 so that the support member 146 can support the light emitter 100. In some implementations, the support member 146 can include one or more holes 147 to allow electrical cables and/or air to pass through the support member 146. In some implementations, the light source 100 can be secured to the light guide 142 by an adhesive (or other securing mechanism) at the ends 148 of one or both of the reflector portions 104a and 104b. The input 150 of the light guide 142 can be positioned adjacent the output aperture 128 of the light source 100.

Figure 10B:
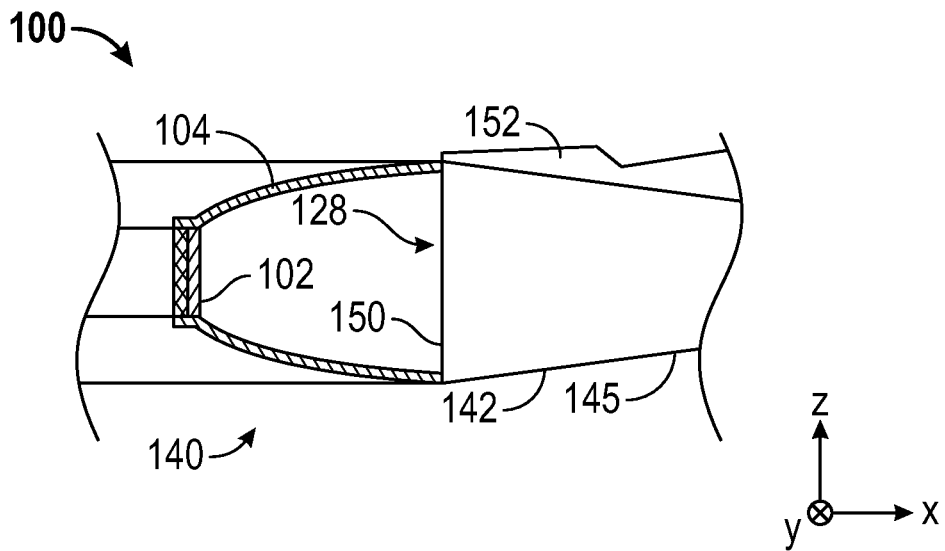
FIG. 10B shows an example cross-sectional view of the lighting system of FIG. 9A or 9B having a tapered light guide.
Figure 10C:
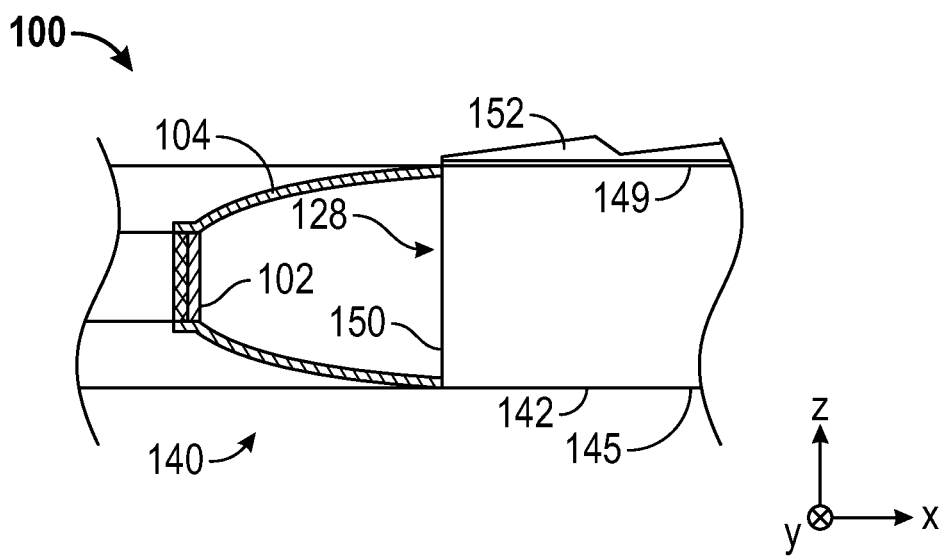
FIG. 10C shows an example cross-sectional view of the lighting system of FIG. 9A or 9B having a frustrated total internal reflection layer disposed between the light guide and the light extraction features.

The light guide 142 can include light extraction features 152 configured to redirect light guided by the light guide 142 so that the redirected light exits an output face 145 of the light guide 142 (e.g., towards a target lighting area). Various types of light extraction features 152 can be used to redirect light that is propagating through the light guide 142. For example, the light extraction features 152 can be configured to provide a substantially uniform distribution of light from the light guide 142 towards the target lighting area. The light extraction features 152 can include ridges and/or grooves on the light guide 142. The implementations shown in FIGS. 9A and 9B include concentric circular ridges or grooves, which can form prismatic features. Various other configurations of the light extraction features 152 can be used to produce different light distributions depending on the particular target lighting area and/or the configuration of the light guide 142. In one implementation, the light guide 142 is tapered and the light extraction features 152 can be evenly spaced between the inner perimeter 141 and the outer perimeter 143 of the tapered light guide 142. In an alternative implementation, the light guide 142 is non-tapered and the light extraction features 152 near the outer perimeter 143 of the light guide 142 can be disposed closer to each other, whereas the light extraction features 152 near the inner perimeter 141 of the light guide 142 and the light source 100 can be disposed farther from each other. As such, the light extraction features 152 can be configured to output more light near the outer perimeter 143 of the light guide 142 than at other portions thereof. In some implementations, the light extraction features 152 can include scattering features configured to scatter light that strikes the scattering features. In some implementations, frusta-shaped or conical light turning features (e.g., pits) can be used. In some implementations, the light extraction features 152 can be separate from the light guide 142, for example, formed as a prismatic film or other additional layers attached to a surface of the light guide 142. The light guide 142 can also include coatings or layers, such as a layer for encouraging TIR or a frustrated TIR (FTIR) layer, or otherwise modifying the optical properties of the light guide 142. FIG. 10B shows an example cross-sectional view of the lighting system 140 of FIG. 9A or 9B having a tapered light guide 142. FIG. 10C shows an example cross-sectional view of the lighting system 140 of FIG. 9A or 9B having a frustrated total internal reflection (FTIR) layer 149 disposed between the light guide 142 and the light extraction features 152. In some implementations, the light guide 142 can be tapered, as shown in FIG. 10B and can also have coatings or layers (such as the FTIR layer 149 shown in FIG. 10C) between the light guide 142 and the light extraction features 152.

Figure 11:
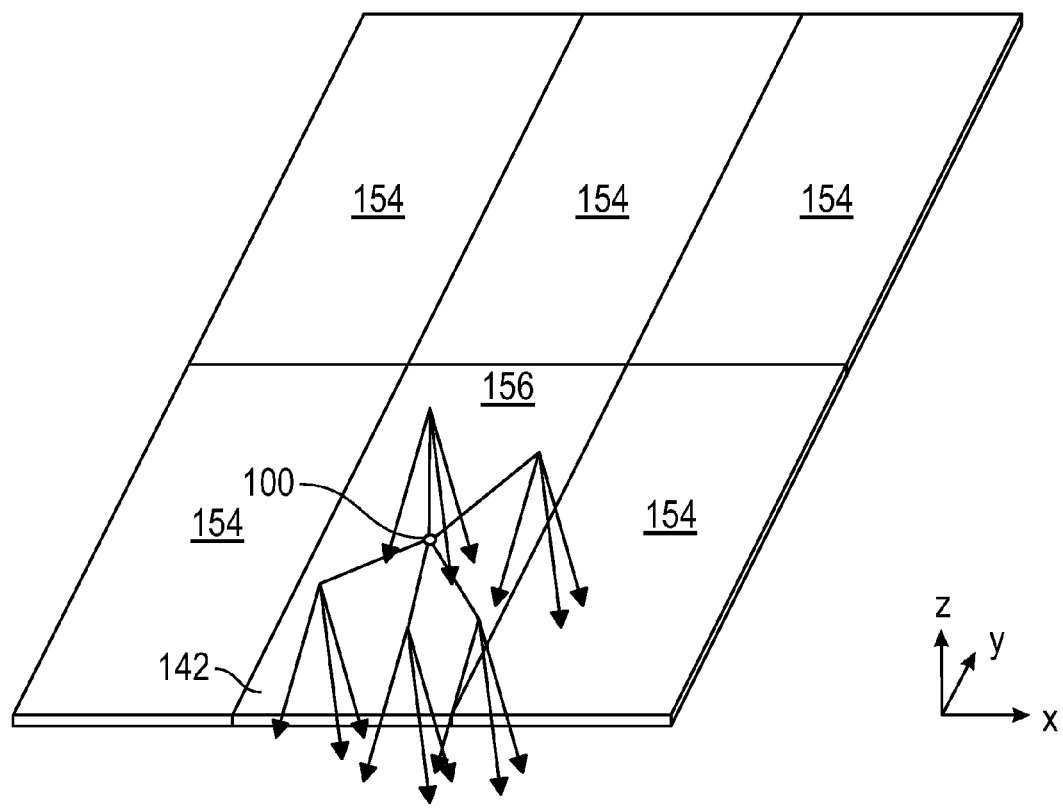
FIG. 11 shows an example implementation of a lighting system for overhead lighting.

FIG. 11 shows an example implementation of a lighting system 156 for overhead lighting. The lighting system 156 can include a light source 100 and a light guide 142 including features similar to, or the same as, the lighting system 140 described in connection with FIGS. 9 and 10 (e.g., turning features including concentric circular ridges or grooves). The light guide 142 can be generally rectangular in shape, and can be configured to be mounted into a ceiling of a room, for example, adjacent to acoustic tiles 154. The light exiting the light guide 142 can be scattered by scatter features (e.g., in an optical layer on a side of the light guide 142 opposite the turning features) to produce generally uniform distribution of light in a target lighting area below the lighting system 156. In some implementations, the effect of the area occupied by the light source 100, for which light is not output from the light guide 142, on the distribution of light across the target lighting area may be substantially unnoticeable due to the relatively small size of the light source 100.

Figure 12:
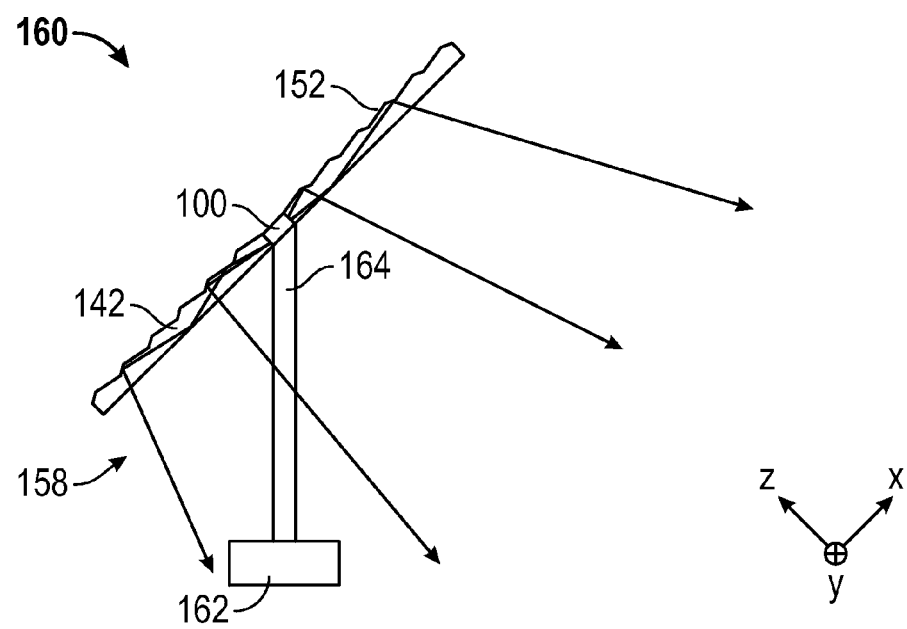
FIG. 12 shows an example implementation of a lamp that includes a lighting system.

FIG. 12 shows an example implementation of a lamp 158 that includes a lighting system 160. The lighting system 160 can include a light source 100 and a light guide 142. The light guide 142 can include light extraction features 152 configured to direct light out of the light guide 142 toward the target lighting area. The turning features 152 can be similar to, or the same as, the lighting system 140 described in connection with FIGS. 9 and 10 (e.g., concentric circular ridges or grooves). The lamp 158 can include a base 162 and a stand 164 configured to suspend the lighting system 160 above the target lighting area. The light source 100 can be positioned at or near the end of the stand 164, so that the light source 100 can be hidden from view and/or so that electrical cables can extend through the stand 164 to the light source 100 to provide power and/or control signals to the light emitters 102. In some implementations, air can be directed through the stand 164 to the light source 100 to remove heat, as discussed in more detail elsewhere herein. In the implementation shown, the light guide 142 can be angled with respect to the stand 164 to provide illumination to a target area that is not centered around the lamp 158. The light source 100 and light guide 142 may be coupled to the stand 164 with a ball joint or the like to allow adjustment of the angle of the light guide 142 with respect to the stand 164.

Figure 13:
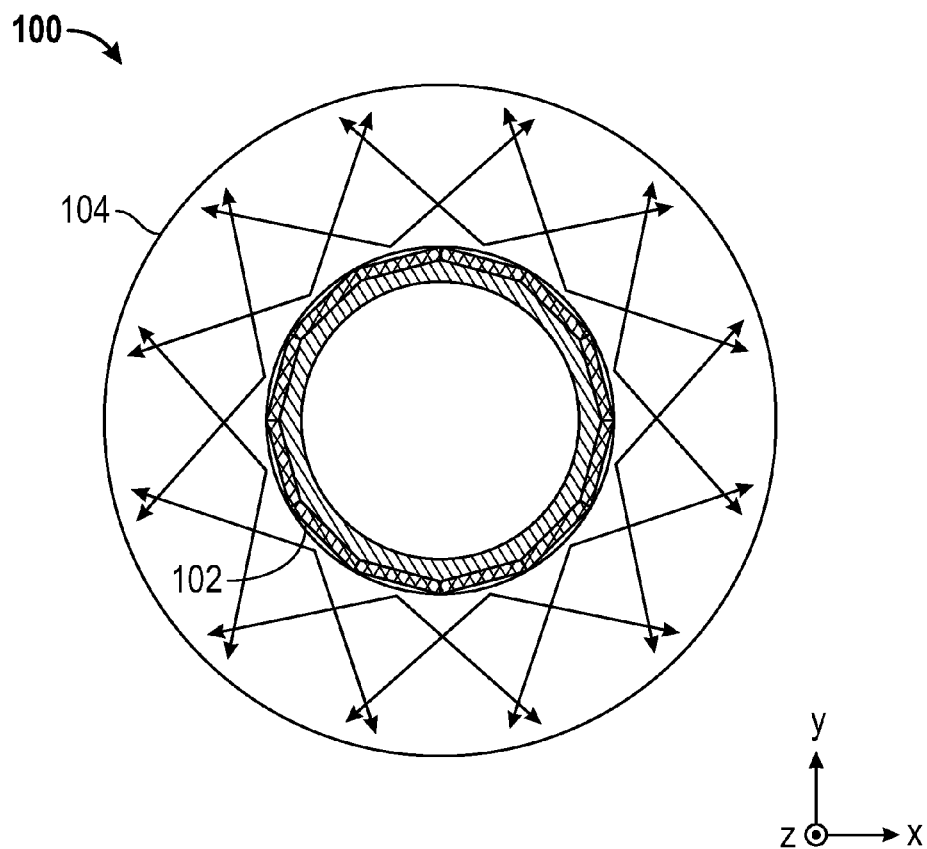
FIG. 13 shows a cross-sectional view of an example implementation of a light source taken in the xy-plane.

FIG. 13 shows a cross-sectional view of an example implementation of a light source 100 taken in the xy-plane. In the implementation illustrated in FIG. 13, the light source 100 includes light emitters 102 distributed across the sides (e.g., 12 sides in FIG. 13) of a polygonal shape across a full circumference of about 360°. The light from the light emitters 102 can propagate radially outwardly away from the longitudinal axis 106 across the circumference angle of the light source 100 (a full circumference of about 360° in FIG. 13). The light emitters 102 can have, for example, a Lambertian distribution having an emission distribution of about ±90° (about ±60° full-width-half-maximum (FWHM)) from the direction normal to the surface of the light emitter 102. As discussed above, the arcuate collimating reflector 104 can at least partially collimate light emitted by the light emitters 102 along planes containing the z-axis (longitudinal axis 106) such as the xz-plane and the yz-plane. Light propagating from the light emitters 102 in the xy-plane can exit the light source 100 without contacting the reflector 104. Light exiting the light source 100 in the xy-plane can maintain the distribution of light produced by the light emitters 102 (e.g., Lambertian distribution). In FIG. 13, the ±60° FWHM lines are shown for the 12 light emitters 102, illustrating that the light can be substantially evenly distributed in the xy-plane.

Figure 14:
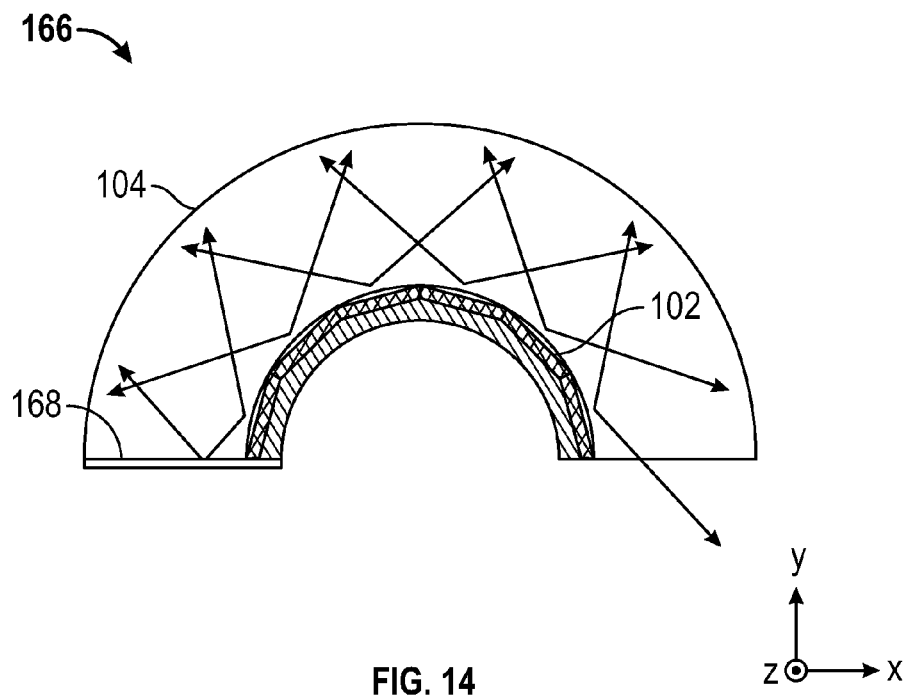
FIG. 14 shows a cross-sectional view of an example implementation of a light source having a circumference of about 180° taken in the xy-plane.
Figure 15:
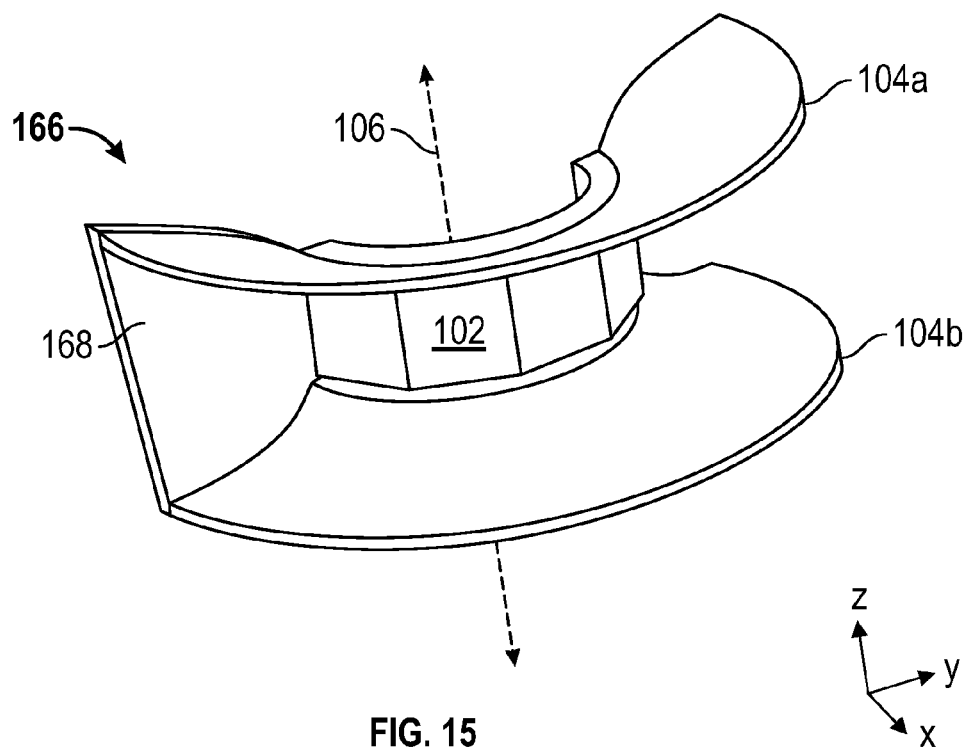
FIG. 15 shows an isometric view of an example implementation of a light source having a circumference of about 180°.
Figure 16:
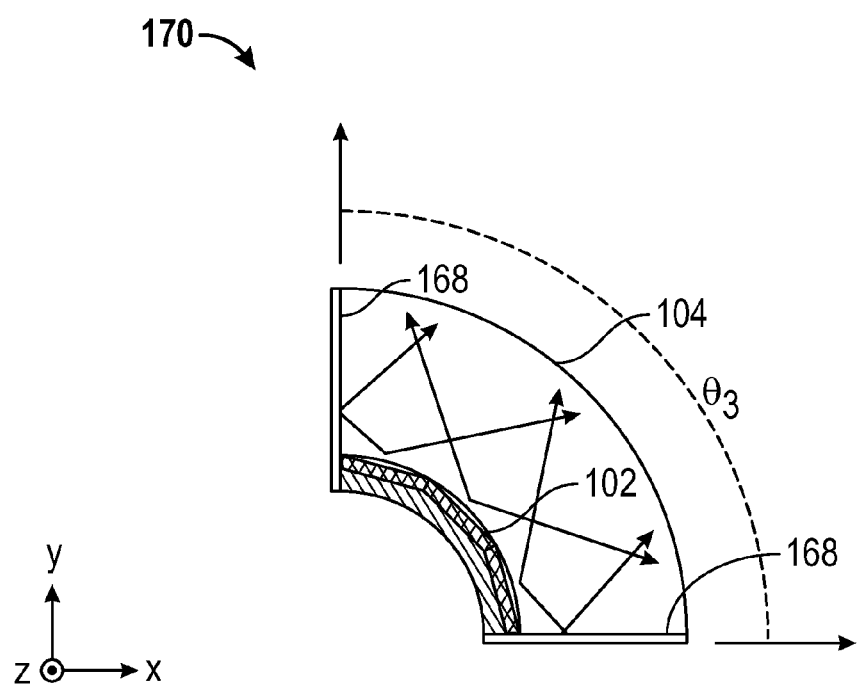
FIG. 16 shows a cross-sectional view of an example implementation of a light source having a circumference of about 90° taken in the xy-plane.

In some implementations, the light source 100 can include light emitters 102 that are disposed about a partial circumference of less than 360°. FIG. 14 shows a cross-sectional view of an example implementation of a light source 166 having a circumference of about 180° taken in the xy-plane. FIG. 15 shows an isometric view of an example implementation of a light source 166 having a circumference of about 180°. The light source 166 can have features similar to those of the light source 100 (e.g., light emitters 102, upper and lower reflective portions 104a and 104b, respectively, configured to substantially preserve etendue (e.g., to preserve etendue)). In FIG. 14, the ±60° FWHM lines are shown for the light emitters 102. In some implementations, the light source 166 can include one or more reflectors 168 positioned at one or both ends thereof. In FIGS. 14 and 15, only one reflector 168 is shown at one end of the light source 166. The reflector 168 can redirect at least a portion of the light that is emitted from the light emitters 102 in a direction outside the circumference angle of the light source 100 (e.g., about 180°) in FIGS. 14 and 15. In some implementations, the light source 166 can be configured to substantially evenly distribute light radially in the xy-plane across the circumference of the light source 166 (e.g., about 180°). FIG. 16 shows a cross-sectional view of an example implementation of a light source 170 having a circumference angle of about 90° taken in the xy-plane. The light source 170 of FIG. 16 is shown including reflectors 168 at both ends thereof, similar to the reflector 168 discussed in connection with FIGS. 14 and 15, although in some cases the reflectors 168 can be omitted from the light source 170. The light source 170 can be configured to substantially evenly distribute light radially in the xy-plane across the circumference angle $\theta_3$ of the light source 170 (e.g., about 90° in FIG. 16). Various other circumference angles $\theta_3$ can be used other than those shown in the illustrated implementations depending on the particular aspects of the lighting application.

Figure 17:
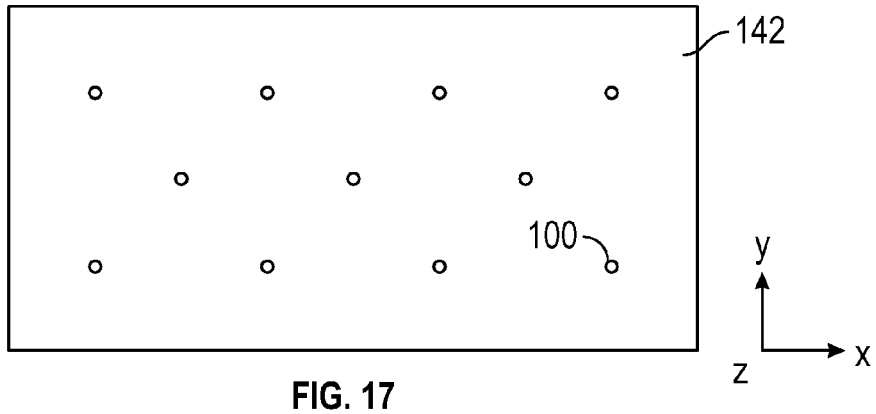
FIG. 17 shows an example implementation of a lighting system that includes multiple light sources.
Figure 18:
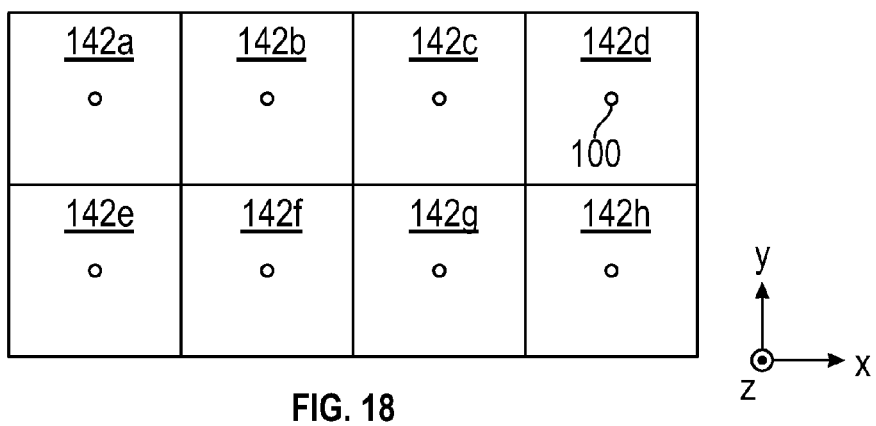
FIG. 18 shows another example implementation of a lighting system that includes multiple light sources.
Figure 19:
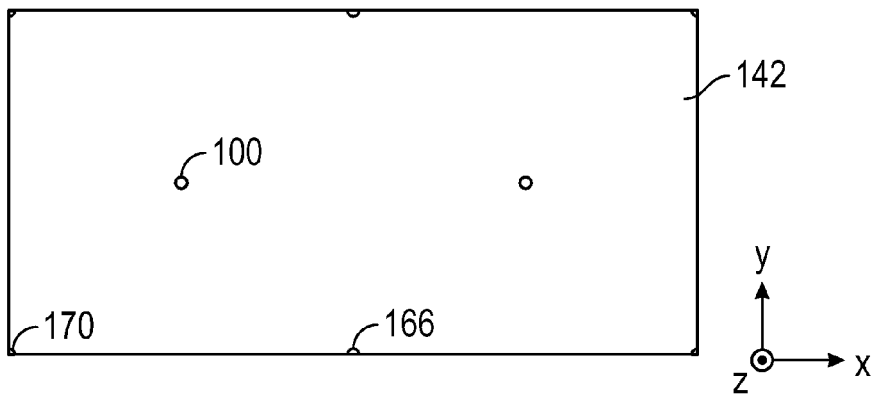
FIG. 19 shows yet another example implementation of a lighting system that includes multiple light sources.

FIG. 17 shows an example implementation of a lighting system 172 that includes multiple light sources 100. The light sources 100 are configured to direct light into a light guide 142. The light sources 100 can be substantially evenly distributed across the light guide 142, and can be spaced inwardly from the edges of the light guide 142. FIG. 18 shows another example implementation of a lighting system 174 that includes multiple light sources 100. In FIG. 18, multiple light guides 142a-142h are included, each having one or more light sources 100 providing light coupled thereto. In some implementations, masks or other light blocking elements can be positioned between the light guides 142a-142h so that each light guide 142a-142h is illuminated independently, or the light guides 142a-142h can be optically coupled so that a light source 100 can illuminate neighboring light guides 142a-142h. FIG. 19 shows yet another example implementation of a lighting system 176 that includes multiple light sources 100, 166, and 170. The lighting system 176 can include one or more edge-lighting light sources 166 (which can be configured to distribute light across about 180° into the light guide 142 from the edge(s) of the light guide 142), and/or one or more corner-lighting light sources 170 (which can be configured to distribute light across about 90° into the light guide 142 from the corner(s) of the light guide 142). In some implementations, the lighting system 176 can also include one or more light sources 100 spaced apart from the edges of the light guide 142 (which can be configured to distribute light across about 360° into the light guide 142). Many variations are possible. For example, the lighting systems 172, 174, and 176 can be illuminated using a single light source 100, 166, or 170.

Figure 20:
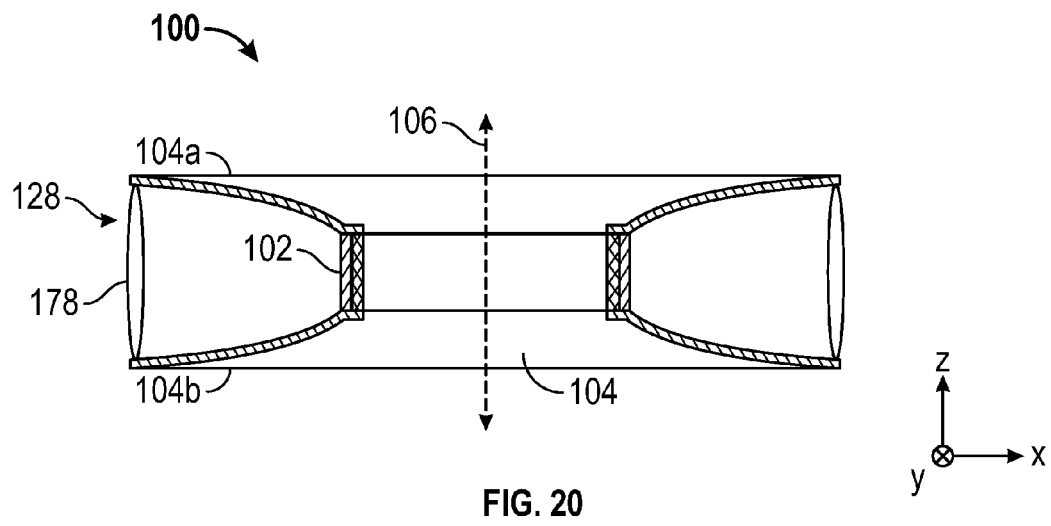
FIG. 20 shows a cross-sectional view of a light source that includes at least one lens taken across the longitudinal axis.

FIG. 20 shows a cross-sectional view of a light source 100 that includes at least one lens 178 taken across the longitudinal axis. The lens 178 can be generally toroidal in shape, such as an asymmetrical (e.g., cylindrical) lens curved about the longitudinal axis 106 (z-axis). The lens 178 can have optical power in the z-direction, such that light propagating in a plane containing the z-axis (e.g., the xz-plane or the yz-plane) is modified by the optical power of the lens 178, and the lens 178 can have substantially no optical power for light propagating in the xy-plane. The lens 178 can be configured to converge light in the z-direction (e.g., toward the xy-plane). In some implementations, the lens 178 can be configured to further collimate the light that was partially collimated by the collimating reflector 104. In some implementations, light propagating in a plane containing the z-axis can be fully collimated or substantially fully collimated upon exiting the lens 178. In some implementations, multiple lenses 178 can be used. The lens 178 can be positioned adjacent or near the output aperture 128 of the reflector 104, and in some cases can be spaced radially inwardly from the output aperture 128 sufficiently to allow a light guide 142 (not shown in FIG. 20) to be positioned adjacent to radially outer ends of the reflector 104. In some implementations, the lens 178 provides structural support or rigidity to the reflector 104, for example inhibiting reflector portions 104a and 104b from collapsing towards each other.

Figure 21A:
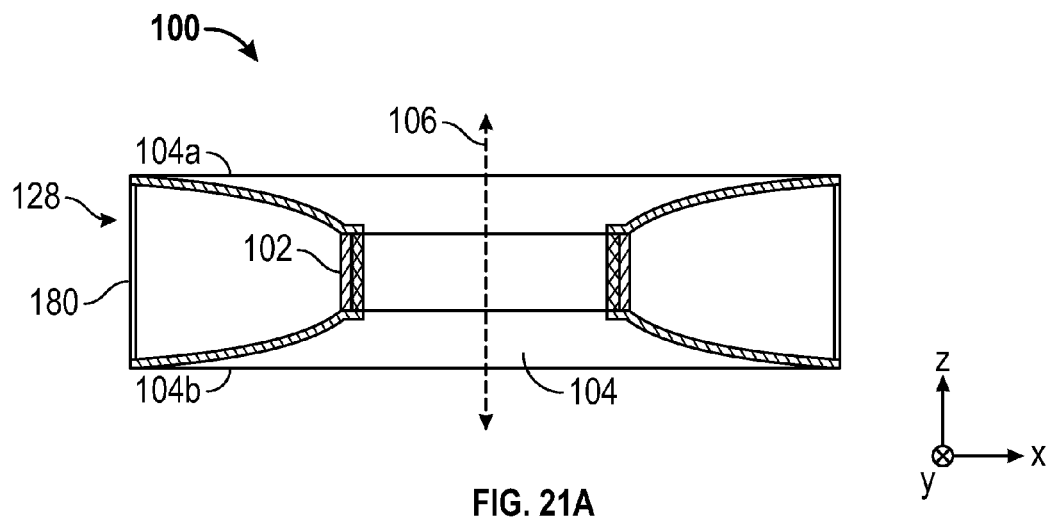
FIG. 21A shows a cross-sectional view of a light source that includes one or more filters taken across the longitudinal axis.
Figure 21B:
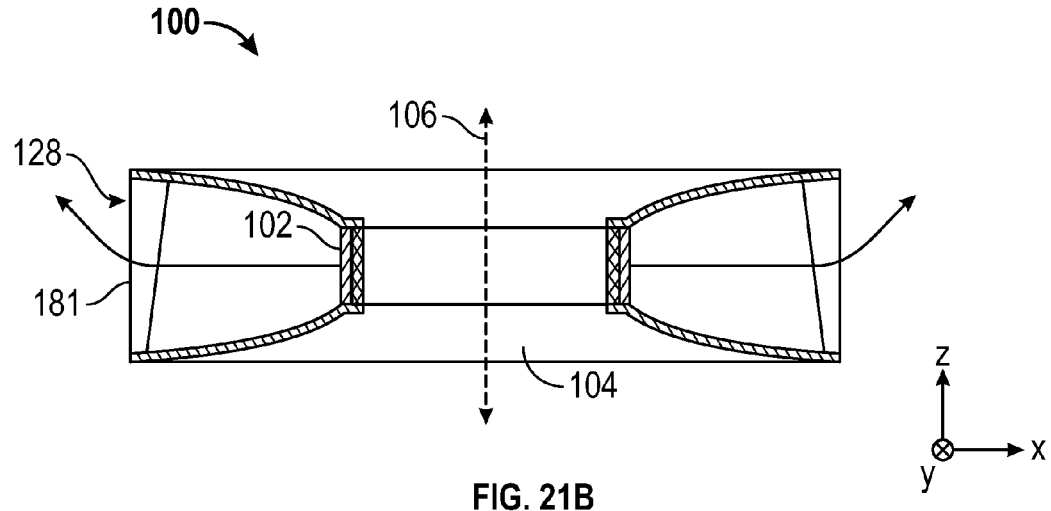
FIG. 21B shows a cross-sectional view of a light source that includes one or more prisms taken across the longitudinal axis.

FIG. 21A shows a cross-sectional view of a light source 100 that includes one or more filters 180 taken across the longitudinal axis. The filter 180 is configured to modify the light output by the light source 100. In some implementations, the light emitted by the light source 100 can be monochromatic. Other optical elements can be used instead of, or in addition to, the lens 178 and/or filter 180 of FIGS. 20 and 21, respectively, such as, for example, a holographic film, a lenticular film, a prism, a reflector, and/or a phosphor positioned at or near the radially outer end of the reflector 104. The one or more optical elements can be configured to provide structural support to the reflector 104 (e.g., to prevent the reflector portions 104a and 104b from collapsing towards each other). In some implementations, an optical element can be configured to change the direction of light emitted by the light source 100 so that the light is not centered on the xy-plane, for example, by turning the light (e.g., by reflection or refraction). FIG. 21B shows a cross-sectional view of a light source 100 that includes one or more prisms 181 taken across the longitudinal axis. The prism 181 can be configured to turn the light output by the light source 100. The various optical elements discussed in connection with FIGS. 20, 21A, and 21B can be used in various combinations to achieve various optical results.

Figure 22:
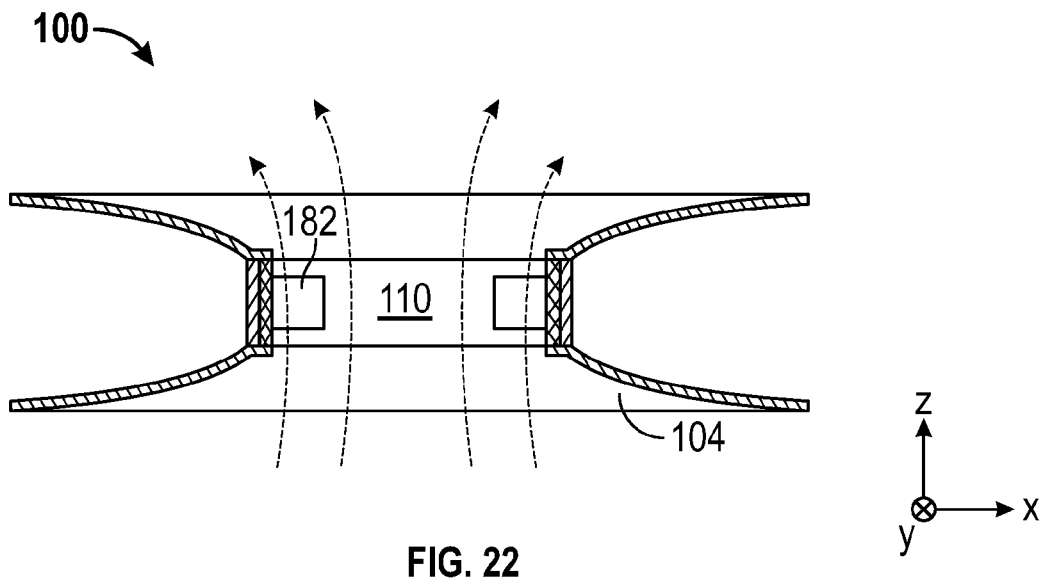
FIG. 22 shows a cross-sectional view of a light source that includes one or more heat removal elements taken through the longitudinal axis.

FIG. 22 shows a cross-sectional view of a light source 100 that includes one or more heat removal elements taken through the longitudinal axis. In some implementations, a hole or opening 110 can extend through the light source 100 and air can be allowed or caused to flow through the opening 110. The air can carry away heat produced by the light emitters 102. In some implementations, one or more fins 182 can extend into the recess formed by the opening 110 and can be thermally coupled to the light emitters 102 so that the fins 182 can increase the exposed surface area and improve heat dissipation. The fins 182 can extend partially (as shown) or fully across the opening 110. The air can be allowed to passively flow through the opening 110, or a fan or other air movement element can be used to drive air through the opening 110. The opening 110 itself, the one or more fins 182 themselves, or the combination of the opening 110 and the fins 182 can be considered a whole, or part of, a heat removal element.

Figure 23:
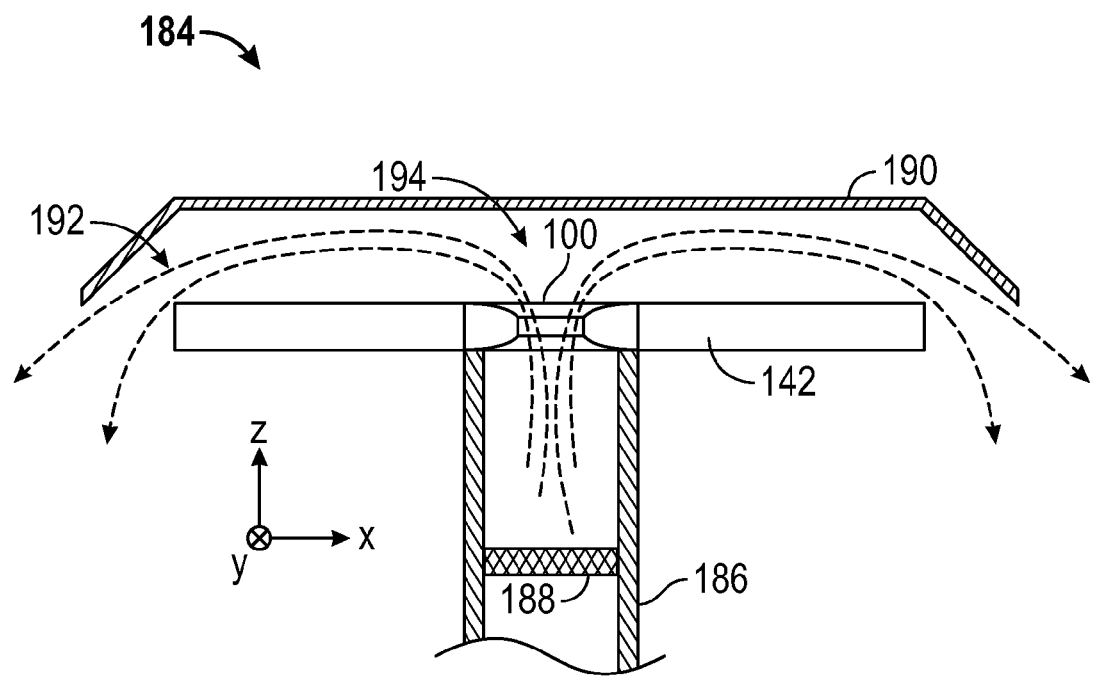
FIG. 23 shows a cross-sectional view of a lighting system that includes one or more heat removal elements taken in the xz-plane.

FIG. 23 shows a cross-sectional view of a lighting system 184 that includes one or more heat removal elements taken in the xz-plane. A light source 100 can be optically coupled to a light guide 142, as described herein. An air conduit 186 can be coupled to the light source 100 so that air can travel through the conduit 186 and through the light source 100 to remove heat. A fan 188 can be positioned in or near the air conduit 186 and can be configured to drive air towards the light source 100. In some implementations, the lighting system 184 can include a housing or other structure 190 positioned behind the light guide 142, forming a recess 194 between the light guide 142 and the structure 190. The recess 194 can be vented (e.g., by one or more vents 192) to provide a path for air flow to exit the lighting system 184. The structure 190 can produce the components of the system 184, which allowing for heat dissipation. The air conduit 186 itself, the structure 190 itself, the one or more vents 192 themselves, and combinations including the air conduit 18, the structure 190, and/or the vents 192 can be considered a whole, or part of, a heat removal element. The heat removal elements described with respect to FIG. 22 can be combined with the heat removal elements described with respect to FIG. 23.

Figure 24:
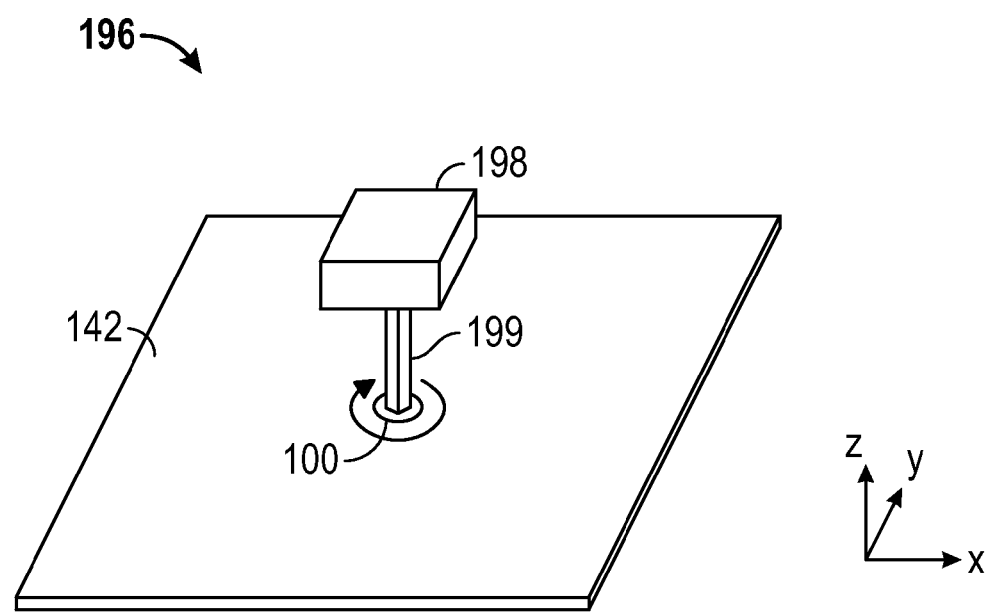
FIG. 24 shows an example implementation of a lighting system that includes a rotation mechanism.

FIG. 24 shows an example implementation of a lighting system 196 that includes a rotation mechanism. The rotation mechanism is configured to rotate the light source 100. The rotation mechanism can include a motor 198 and an actuator 199 (e.g., a shaft) configured to mechanically couple the light source 100 to the motor 198. The motor 198 can rotate the actuator 199, which can rotate the light source 100. The light source 100 can include a hole 110 therein, which can have a shape configured to receive the shaft 199 (e.g., a hexagon or other polygonal shape) so that rotation of the shaft 199 causes rotation of the light source 100. The light source 100 can be rotationally mounted into the light guide 142 so that the light source 100 can rotate with respect to the light guide 142 (although in some implementations, the light guide 142 can be rotated with the light source 100). In this implementation, and in other implementations discussed herein, the light source 100 can be used without a light guide 142 to illuminate a narrow area in the xy-plane.

Rotation of the light source 100 can facilitate the substantially uniform distribution of light from the light source 100. For example, in some implementations, patterns of light can be produced due to off-axis light that propagates from the light emitters 102 in a direction that does not intersect the longitudinal axis 106. The off-axis light can be collimated by a different amount than the light propagating in a direction the intersects the longitudinal axis 106, which can produce subtle patterns of bright and dim areas and varying amounts of light spreading at different angles. The arrangement of the light emitters 102 around the polygonal shape can also produce subtle irregularities in the distribution of light from the light source 100. The light source 100 can be rotated at a speed sufficient to cause the irregularities in the light distribution to blend together, creating more uniform illumination. In some implementations, the light emitters 102 can emit different colors on different sides of the polygon shape, and the light source 100 can be rotated at a speed sufficient to cause the different colors of light to blend together to form white light or substantially white light, or other color used for a particular application. Rotation of the light source 100 can also facilitate heat dissipation. For example, the rotation mechanism can include a fan or the like to help air flow through a hole 110, across fins 182, towards a structure 190, etc.

Figure 25:
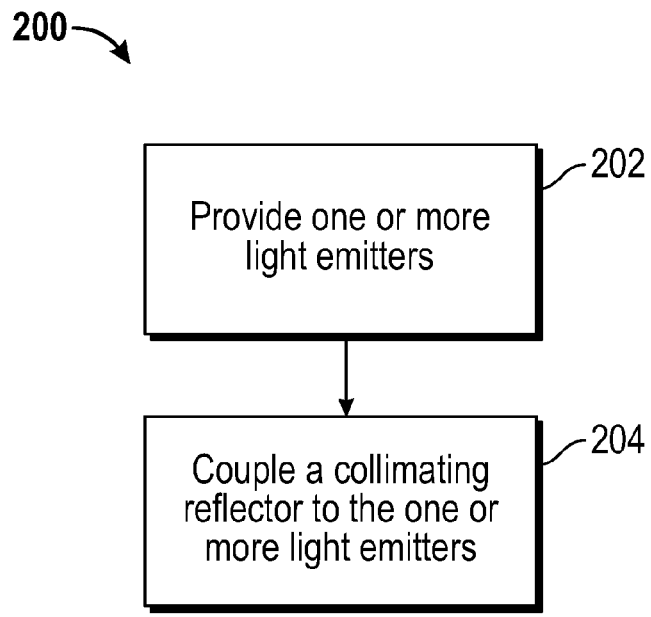
FIG. 25 shows an example implementation of a method for making a light source.

FIG. 25 shows an example implementation of a method for making a light source. At block 202, the method 200 can include providing one or more light emitters 102, which can be disposed about a longitudinal axis 106 and can be oriented to output light radially outwardly away from the longitudinal axis 106. At block 204, the method 200 can include coupling a collimating reflector 104 to the one or more light emitters 102 (e.g., such that the collimating reflector 104 is radially outward of the light emitters 102). The light emitters 102 can fill or substantially fill the input aperture 106 of the reflector 104 (e.g., in the direction of the longitudinal axis 106, which can be in the z-direction). All or part of the reflector 104 can be configured to at least partially collimate the light output by the light emitters 102 and to substantially preserve etendue (e.g., to preserve etendue) as described herein. In some implementations, the resulting partial collimation can be greatest for light propagating in planes containing the longitudinal axis 106.

Figure 26:
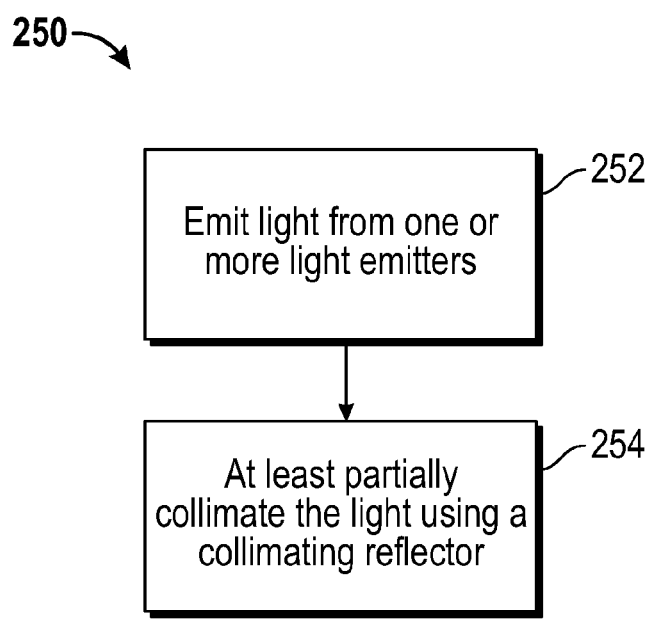
FIG. 26 shows an example implementation of a method for using a light source.

FIG. 26 shows an example implementation of a method for using a light source. At block 252, the method 250 can include emitting light from one or more light emitters 102 that are disposed about a longitudinal axis 106. The light emitted from the light emitters 102 can propagate radially outwardly away from the longitudinal axis. The method 250 for using the light source 100 can also include at least partially collimating the light using a collimating reflector 104 (e.g., disposed radially outward of the light emitters 102), at block 254. The one or more light emitters 102 can fill or substantially fill an input aperture 106 of the reflector 104 (e.g., in the direction of the longitudinal axis 106). Using the light source 100 can also include substantially preserving etendue (e.g., preserving etendue) of the light output by light emitters 102. In some implementations, the resulting partial collimation can be greatest for light propagating in planes containing the longitudinal axis 106.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings or described in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated or discussed operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products. Additionally, other implementations are within the scope of the following claims. In some cases, the actions recited in the claims can be performed in a different order and still achieve desirable results.

What is claimed is:

1. A light source comprising:
one or more light emitters having one or more light emitting surfaces disposed about a longitudinal axis and oriented to output light radially outwardly away from the longitudinal axis; and
a collimating reflector disposed radially outward of the one or more light emitters, all or part of the collimating reflector configured to at least partially collimate light output by the one or more light emitters and to substantially preserve etendue of the light output by the one or more light emitters, the collimating reflector including an input aperture having a width in a direction of the longitudinal axis, the one or more light emitting surfaces extending across substantially the entire width of the input aperture in the direction of the longitudinal axis, wherein the collimating reflector includes an upper reflective surface above the input aperture and a lower reflective surface below the input aperture, wherein the upper reflective surface has a parabolic curvature with a focal point located substantially at a lower end of the input aperture, and wherein the lower reflective surface has a parabolic curvature with a focal point located substantially at an upper end of the input aperture.

2. The light source of claim 1, wherein the one or more light emitters are disposed about the longitudinal axis in a closed polygonal shape wherein the one or more light emitters face radially outwardly over a circumference of about 360°.

3. The light source of claim 2, wherein the closed polygonal shape includes at least eight sides.

4. The light source of claim 1, wherein the one or more light emitters are disposed about the longitudinal axis in a partial polygonal shape wherein the one or more light emitters face radially outwardly over a circumference of about 180° or less or of about 90° or less.

5. The light source of claim 1, wherein the one or more light emitters include lighting elements having different colors combinable to produce white light.

6. The light source of claim 5, wherein the one or more light emitters are disposed about the longitudinal axis in a polygonal shape that includes a plurality of sides, wherein a single side of the polygonal shape includes the multiple lighting elements having different colors combinable to produce white light.

7. The light source of claim 6, wherein the multiple lighting elements on the single side of the polygonal shape are arranged in a side-by-side configuration.

8. The light source of claim 6, wherein the multiple lighting elements on the single side of the polygonal shape are arranged in a top-to-bottom configuration.

9. The light source of claim 6, wherein the multiple lighting elements on the single side of the polygonal shape are arranged in a grid that includes a plurality of lighting elements in the direction of the longitudinal axis and a plurality of lighting elements in a direction transverse to the longitudinal axis.

10. The light source of claim 1, wherein the one or more light emitters include at least one of light emitting diode (LED) chips, pre-packaged light emitting diode (LED) chips, organic light emitting diodes (OLEDs), and phosphor layers.

11. A lighting system comprising:
a light guide plate; and
the light source of claim 1 positioned to direct the at least partially collimated light from the light source into the light guide plate.

12. The lighting system of claim 11, wherein the light guide plate has a generally circular shape, and wherein the light source is positioned at substantially a center of the light guide plate.

13. The lighting system of claim 11, wherein the light guide plate includes light extraction elements configured to direct light out of the light guide plate.

14. The lighting system of claim 13, wherein the light extraction elements are configured to direct light out of the light guide plate with a generally uniform distribution.

15. The lighting system of claim 13, wherein the light extraction elements are disposed on one or more of a top side and a bottom side of the light guide plate, and wherein the light extraction elements are disposed between an inner perimeter and an outer perimeter of the light guide plate, the light extraction elements configured to direct light out of the light guide plate from an output face bounded by the inner and outer perimeters of the light guide plate.

16. The lighting system of claim 11, further comprising a plurality of the light sources at a plurality of locations across the light guide plate.

17. The light source of claim 1, further comprising a rotation mechanism configured to rotate the one or more light emitters about the longitudinal axis to substantially evenly distribute the light output by the one or more light emitters.

18. The light source of claim 1, further comprising:
an opening behind the one or more light emitters; and
a heat removal element configured to remove heat from the one or more light emitters through the opening.

19. The light source of claim 18, wherein the heat removal element includes a fan configured to direct air flow through the opening or a heat pipe that extends through the opening.

20. The light source of claim 18, wherein the heat removal element includes one or more fins extending into the aperture, wherein the fins are coupled to the one or more light emitters and are configured to remove heat from the one or more light emitters.

21. The light source of claim 1, further comprising at least one optical element proximate to an outer perimeter of the collimating reflector, the optical element configured to modify the at least partially collimated light wherein the optical element includes at least one of a phosphor containing layer and a color filter.

22. The light source of claim 1, further comprising a lens proximate to an outer perimeter of the collimating reflector, the lens configured to modify the at least partially collimated light.

23. The light source of claim 1, wherein the one or more light emitters are disposed in a substantially circular shape about the longitudinal axis.

24. The light source of claim 1, wherein the at least partial collimation is greatest for light propagating from the one or more light emitters along planes that contain the longitudinal axis.

25. The light source of claim 1, wherein a distance between the input aperture of the collimating reflector and an output aperture of the collimating reflector is substantially equal to $0.5 \times (w_1+w_2)/\tan \theta_1$,
wherein $w_1$ is the width of the input aperture in the direction of the longitudinal axis,
wherein $w_2$ is a width of the output aperture in the direction of the longitudinal axis, and
wherein $\pm\theta_1$ is an angle of distribution of light emitted from the one or more light emitters across the direction of the longitudinal axis.

26. The light source of claim 1, wherein the one or more light emitting surfaces extend across substantially the entire circumference of the light source.

27. A light source comprising:
means for emitting light, the light emitting means disposed about a longitudinal axis and oriented to output light radially outwardly away from the longitudinal axis; and
means for at least partially collimating the light output by the light emitting means, the at least partially collimating means disposed radially outward of the light emitting means, all or part of the at least partially collimating means configured to substantially preserve etendue of the light output by the light emitting means, the at least partially collimating means including an input aperture having a width in a direction of the longitudinal axis, and the light emitting means extending across substantially the entire width of the input aperture in the direction of the longitudinal axis, wherein the at least partially collimating means includes an upper reflective surface above the input aperture and a lower reflective surface below the input aperture, wherein the upper reflective surface has a parabolic curvature with a focal point located substantially at a lower end of the input aperture, and wherein the lower reflective surface has a parabolic curvature with a focal point located substantially at an upper end of the input aperture.

28. The light source of claim 27, wherein the light emitting means includes one or more light emitters, or wherein the at least partially collimating means includes a collimating reflector.

29. The light source of claim 27, wherein the light emitting means includes at least one of light emitting diode (LED) chips, pre-packaged light emitting diode (LED) chips, organic light emitting diodes (OLEDs), and phosphor layers.

30. The light source of claim 27, wherein the light emitting means includes lighting elements having different colors combinable to produce white light.

31. A lighting system comprising:
    means for guiding light; and
    the light source of claim 27 positioned to direct the at least partially collimated light from the light source into the light guiding means.

32. The lighting system of claim 31, wherein the light guiding means includes light extraction elements configured to direct light out of the light guiding means.

33. The lighting system of claim 31, wherein the light guiding means includes a light guide plate.

34. The light source of claim 27, further comprising a rotation mechanism configured to spin the light emitting means about the longitudinal axis to substantially evenly distribute the light output by the light emitting means.

35. A method of making a light source, the method comprising:

providing one or more light emitters having one or more light emitting surfaces disposed about a longitudinal axis and oriented to output light radially outwardly away from the longitudinal axis; and coupling a collimating reflector radially outward of the one or more light emitters, the collimating reflector including an input aperture having a width in a direction of the longitudinal axis, the one or more light emitting surfaces extending substantially entirely across the width of the input aperture in the direction of the longitudinal axis, and all or part of the collimating reflector configured to at least partially collimate the light output by the one or more light emitters and to substantially preserve etendue of the light, wherein the collimating reflector includes an upper reflective surface above the input aperture and a lower reflective surface below the input aperture, wherein the upper reflective surface has a parabolic curvature with a focal point located substantially at a lower end of the input aperture, and wherein the lower reflective surface has a parabolic curvature with a focal point located substantially at an upper end of the input aperture.

36. The method of claim 35, further comprising coupling a light guide plate to the collimating reflector, the light guide plate configured to receive the at least partially collimated light.

37. The method of claim 35, further comprising coupling a rotation mechanism to the one or more light emitters, the rotation mechanism configured to rotate the one or more light emitters about the longitudinal axis to substantially evenly distribute the light output by the one or more emitters.

* * * * *